(12) United States Patent  
Birger

(10) Patent No.: US 9,493,922 B2  
(45) Date of Patent: Nov. 15, 2016

(54) FLOATING DEVICE AND METHOD OF USING THE SAME

(75) Inventor: Zeev Birger, Ramat-HaSharon (IL)

(73) Assignee: NeoTop Water Systems Ltd., Tel-Aviv (IL)

( * ) Notice: Subject to any disclaimer, the term of this patent is extended or adjusted under 35 U.S.C. 154(b) by 207 days.

(21) Appl. No.: 13/805,677

(22) PCT Filed: Jun. 21, 2011

(86) PCT No.: PCT/IL2011/000492  
§ 371 (c)(1),  
(2), (4) Date: Dec. 20, 2012

(87) PCT Pub. No.: WO2011/161675  
PCT Pub. Date: Dec. 29, 2011

(65) Prior Publication Data  
US 2013/0121766 A1  May 16, 2013

Related U.S. Application Data

(60) Provisional application No. 61/356,677, filed on Jun. 21, 2010, provisional application No. 61/476,282, filed on Apr. 17, 2011.

(51) Int. Cl.  
*E02B 3/00* (2006.01)  
*E04H 4/08* (2006.01)  
(Continued)

(52) U.S. Cl.  
CPC ............... *E02B 3/00* (2013.01); *A01K 63/04* (2013.01); *A01M 29/32* (2013.01); *A63H 23/10* (2013.01); *B63B 22/18* (2013.01); *B63B 22/20* (2013.01);  
(Continued)

(58) Field of Classification Search  
USPC ..................... 405/52; 126/561–568  
See application file for complete search history.

(56) References Cited

U.S. PATENT DOCUMENTS

| 1,248,796 A | 12/1917 | Bombara |
| 1,374,943 A | 4/1921 | Melvin |

(Continued)

FOREIGN PATENT DOCUMENTS

| AU | 2004100619 | 8/2004 | |
| FR | 2758356 A1 * | 7/1998 | ............... E04H 4/06 |

(Continued)

OTHER PUBLICATIONS

International Preliminary Report on Patentability Dated Jan. 10, 2013 From the International Bureau of WIPO Re. Application No. PCT/IL2011/000492.

(Continued)

*Primary Examiner* — Benjamin Fiorello  
*Assistant Examiner* — Kyle Armstrong

(57) ABSTRACT

A floating device is disclosed. The device comprises a first cup member and a second cup member, each having a base and an open end, the first cup member being formed with an opening at a center of a respective base. In some embodiments of the present invention the device comprises a connector member having a peripheral wall fittingly connected to the open ends and enclosing a barrier. The peripheral wall is preferably formed with openings arranged between the barrier and the first cup member such that, when the floating device contacts a liquid, the liquid enters through the openings into the first cup member to submerge the first cup member and to impart a restorable upright orientation to the device.

15 Claims, 26 Drawing Sheets

(51) Int. Cl.
    *B65D 88/36*     (2006.01)
    *F24J 2/04*     (2006.01)
    *A63H 23/10*     (2006.01)
    *B63B 22/18*     (2006.01)
    *B63B 22/20*     (2006.01)
    *F24J 2/52*     (2006.01)
    *A01M 29/32*     (2011.01)
    *A01K 63/04*     (2006.01)

(52) U.S. Cl.
    CPC ............... *E04H 4/08* (2013.01); *F24J 2/0472* (2013.01); *F24J 2/5267* (2013.01); *B65D 88/36* (2013.01); *Y02E 10/47* (2013.01); *Y10T 29/49893* (2015.01)

(56) References Cited

U.S. PATENT DOCUMENTS

| | | | |
|---|---|---|---|
| 2,553,798 A | 5/1951 | Van Deventer | |
| 3,147,067 A | 9/1964 | Salyer | |
| 3,462,040 A | 8/1969 | Galloway | |
| 3,683,428 A | 8/1972 | Morris | |
| 3,687,329 A | 8/1972 | Baum | |
| 3,694,837 A | 10/1972 | Von Norring | |
| 3,872,522 A | 3/1975 | Bennett et al. | |
| 3,938,338 A | 2/1976 | Cullen | |
| 3,984,881 A | 10/1976 | Gerlach | |
| 3,984,882 A | 10/1976 | Forman et al. | |
| 3,998,204 A | 12/1976 | Fuchs et al. | |
| 4,022,187 A | 5/1977 | Roberts | |
| 4,270,232 A | 6/1981 | Ballew | |
| 4,359,836 A * | 11/1982 | Yuji | 43/44.9 |
| 4,366,806 A | 1/1983 | Acker | |
| 4,407,607 A * | 10/1983 | McCambridge | 405/26 |
| 4,458,668 A | 7/1984 | Sheldon | |
| 4,749,606 A | 6/1988 | Moore | |
| 5,188,550 A | 2/1993 | Oliver | |
| 7,534,154 B2 * | 5/2009 | Burston et al. | 441/136 |
| 2005/0176532 A1 | 8/2005 | Thorington | |
| 2008/0000903 A1 | 1/2008 | Cap et al. | |
| 2010/0028082 A1 | 2/2010 | Donovan et al. | |
| 2010/0282240 A1 * | 11/2010 | Hare | 126/565 |
| 2012/0024215 A1 * | 2/2012 | Flockenhagen | 114/267 |

FOREIGN PATENT DOCUMENTS

| | | |
|---|---|---|
| FR | 2867983 | 9/2005 |
| GB | 1008495 | 10/1965 |
| GB | 2422325 | 7/2006 |
| JP | 57-052500 | 3/1982 |
| JP | 2000-319952 | 11/2000 |
| NL | 1002693 | 6/1996 |
| WO | WO 98/12392 | 3/1998 |
| WO | WO 99/47213 | 9/1999 |
| WO | WO 2006/010204 | 2/2006 |
| WO | WO 2010/014879 | 2/2010 |
| WO | WO 2011/161675 | 12/2011 |

OTHER PUBLICATIONS

Communication Relating to the Results of the Partial International Search Dated Oct. 25, 2011 From the International Searching Authority Re. Application No. PCT/IL2011/000492.

International Search Report and the Written Opinion Dated Jan. 24, 2012 From the International Searching Authority Re. Application No. PCT/IL2011/000492.

Patent Examination Report Dated Dec. 8, 2015 From the Australian Government, IP Australia Re. Application No. 2011268527.

* cited by examiner

FIG. 2
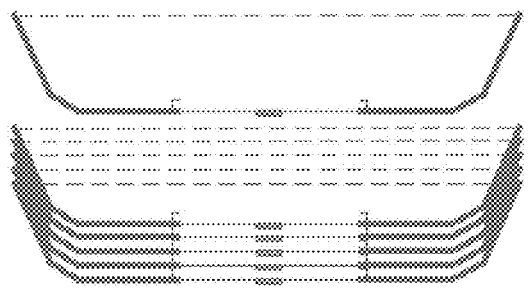
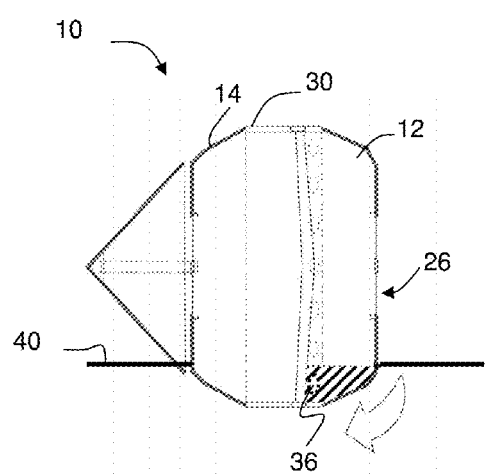
FIG. 3A
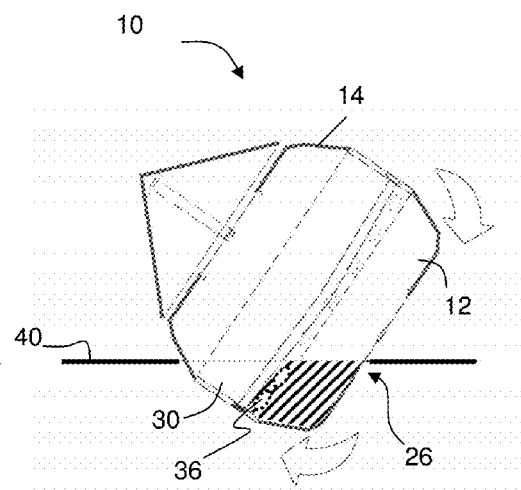
FIG. 3B
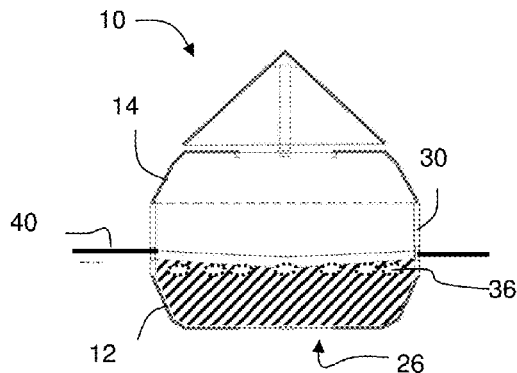
FIG. 3C
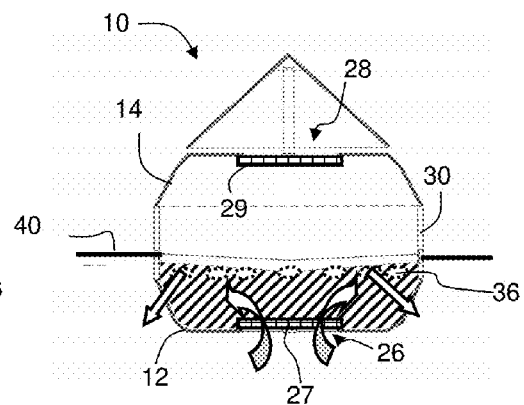
FIG. 3D

FLOATING DEVICE AND METHOD OF USING THE SAME

RELATED APPLICATION

This application is a National Phase of PCT Patent Application No. PCT/IL2011/000492 having International filing date of Jun. 21, 2011, which claims the benefit of priority under 35 USC §119(e) of U.S. Provisional Patent Application Nos. 61/356,677, filed on Jun. 21, 2010, and 61/476,282, filed on Apr. 17, 2011. The contents of the above applications are all incorporated by reference as if fully set forth herein in their entirety.

FIELD AND BACKGROUND OF THE INVENTION

The present invention, in some embodiments thereof, relates to a floating device and, more particularly, but not exclusively, to a floating device that is joinable to other floating devices for the purpose of, e.g., covering a liquid surface. In some embodiments of the present invention a plurality of such floating devices are in the aquaculture industry, e.g., for reducing bird predation of underwater organisms and/or evaporation.

Covering liquid surfaces is a concern in many industries and public sectors. Several techniques have been proposed for such covering, from a spread of a thin layer of floating liquid, such as oil, on the surface to be covered, to the use of large solid films. Of particular relevance are individual floating devises that collectively form a barrier between a surface of liquid and the environment. One example is hollow spherical balls manufactured by Euro-Matic of Wilson, N.C. When deposited on the surface of the liquid, the balls arrange themselves into a cover. Also known are floatable spheroids having flat surfaces surrounding its equatorial plane systems (U.S. Pat. No. 3,998,204). The flat surfaces allow the spheroids to pack closer together on the fluid surface.

International Patent Publication No. WO2010/014879 teaches float members configured to float on and cover a fluid surface to modify a transfer of evaporated fluid therethrough. Each float member is elongated and shaped like a disk with a cross-section having a rhombus shape. The sides of the float member are configured to interlock with adjacent members or have means for attracting adjacent float members to prevent gaps from opening.

Additional background art includes U.S. Pat. Nos. 248, 796, 374,943, 2,553,798, 3,147,067, 3,462,040, 3,683,428, 3,687,329, 3,694,837, 3,872,522, 3,998,204, 3,938,338, 3,984,881, 3,984,882, 4,270,232, 4,022,187, 4,366,806, 4,458,668, 4,749,606 and 5,188,550, and Publication Nos. WO199812392, WO2006/010204, GB1008495, NL1002693 and AU2004100619.

SUMMARY OF THE INVENTION

The inventor of the present invention has devised a floating device that can be used in many applications. The floating device enjoys many properties not possessed by conventional techniques. For example, in some embodiments of the present invention the device functions as a cooling tower. This allows the device to remain cooler than the environmental air for many hours during daytime as well as during the night. Thus, when the device is placed, for example, on a water surface it reduces the temperature of the water underneath the device. A plurality of such devices can be used for reducing the temperatures of the water surface as well as the water bulk. This is an advantage since it increases the quality of water by allowing more dissolved air in. The device optionally and preferably also features evaporation-condensation cycle within the device itself. The advantageous of this cycle is that the condensed water can return to the reservoir and improve the water quality.

The device of the present embodiments can be utilized in many other applications, including, without limitation, covering or partially covering an aquaculture pond to reduce bird predation, dividing a surface of a liquid into two or more surface parts, carrying a construction, collecting solar energy and the like. A more detailed description of some of these potential applications is described hereinunder. While some of the embodiments below are described with a particular emphasis to one or more specific applications for which the device is useful, it is to be understood that more detailed reference to such applications is not to be interpreted as limiting the scope of the invention in any way, and that other applications are not excluded from the scope of the present invention.

According to an aspect of some embodiments of the present invention there is provided a floating device. The device comprises a first cup member and a second cup member, each having a base and an open end, the first cup member being formed with an opening at a center of a respective base. In some embodiments of the present invention the device comprises a connector member having a peripheral wall fittingly connected to the open ends and enclosing a barrier. The peripheral wall is preferably formed with openings arranged between the barrier and the first cup member such that, when the floating device contacts a liquid, the liquid enters through the openings into the first cup member to submerge the first cup member and to impart a restorable upright orientation to the device.

According to an aspect of some embodiments of the present invention there is provided a floating assembly. The floating assembly comprises a plurality of interconnected floating devices, wherein at least a few of the floating devices is the same or similar to the floating device described herein.

According to an aspect of some embodiments of the present invention there is provided a method suitable for at least partially covering a liquid surface. The method comprises placing on the surface a plurality of floating devices wherein at least a few of the floating devices is the same or similar to the floating device described herein.

According to an aspect of some embodiments of the present invention there is provided a method of assembling a floating device. The method comprises receiving a first cup member and a second cup member, each having a base and an open end, the first cup member being formed with an opening at a center of a respective base; receiving a connector member having a peripheral wall formed with a plurality of openings and enclosing a barrier, the peripheral wall being sizewise compatible with the open ends; and fittingly connecting the open ends to the peripheral wall such that a concave side of the barrier is facing the first cup member.

According to an aspect of some embodiments of the present invention there is provided a method suitable for at least partially covering a liquid surface. The method comprises assembling a plurality of floating devices according to the method described above and placing the floating devices on the liquid surface to allow the liquid to enter through the openings into the first cup member such that the first cup member is submerged and a restorable upright orientation of the device is established.

According to some embodiments of the present invention the liquid surface is an aquaculture pond wherein the covering is so as to reduce bird predation.

According to some embodiments of the present invention the floating devices are arranged on the liquid surface so as to divide the surface into at least two surface parts.

According to some embodiments of the present invention the method further comprises covering at least one of the surface parts.

According to some embodiments of the present invention the surface part(s) is covered by placing a plurality of secondary floating devices on the at least one surface part.

According to some embodiments of the present invention at least one of the secondary floating devices comprises a generally spherical hollow body formed with a plurality of openings, and a separator member, wherein at least some of the openings are arranged near the separator member and, at least one of the openings is at a pole the hollow body.

According to some embodiments of the present invention at least one of the secondary floating devices comprises a generally spherical hollow body formed with a plurality of openings, and a solid absorbent occupying a portion of a volume enclosed by the hollow body.

According to some embodiments of the present invention at least one of the secondary floating devices comprises a ball-like structure made of a solid absorbent material and being partially coated by a water resistant dome.

According to some embodiments of the present invention at least one of the secondary floating devices comprises a generally spherical hollow body formed with a plurality of openings and having therein a solid absorbent occupying a portion of a volume of the body.

According to some embodiments of the present invention at least one of the secondary floating devices comprises a generally spherical hollow body formed with a plurality of openings, and a generally non-absorbent porous material occupying a portion of a volume enclosed by the hollow body, wherein a specific weight of the porous material is lower than a specific weight of the liquid surface.

According to some embodiments of the present invention at least one of the secondary floating devices comprises a generally spherical hollow body having a first hemisphere and a second hemisphere, wherein the first and the second hemispheres have different colors.

According to some embodiments of the present invention at least one of the secondary floating devices comprises a generally spherical hollow body formed with a plurality of openings, and a floating member approximately at or near an equator line of the body. According to some embodiments of the present invention the floating member is selected such that there is at least one gap between the floating member and the body.

According to some embodiments of the present invention at least one of the secondary floating devices comprises a generally spherical hollow body having a first hemisphere and a second hemisphere, wherein the first and the second hemispheres are connectable to each other by a plurality of snap connectors.

According to some embodiments of the present invention the openings are distributed peripherally on each hemisphere such that when the hemispheres are assembled, openings of the first hemisphere are azimuthally shifted with respect to openings of the second hemisphere.

According to some embodiments of the present invention at least one of the openings is positioned behind one of the connectors.

According to some embodiments of the present invention at least one of the secondary floating devices comprises a plurality of internal wings arranged at the anterior of the body or near an equator line such as to facilitate circulation of air entering the anterior through at least some of the openings.

According to some embodiments of the present invention at least one of the secondary floating devices comprises a plurality of external wings distributed on external surface of the body, such as to allow winds to rotate the body.

According to some embodiments of the present invention at least one of the secondary floating devices comprises an external peripheral extension surrounding the body, the peripheral extension having an inner peripheral end being in proximity or in contact with the body, an outer peripheral end being farther from the body.

According to some embodiments of the present invention the inner peripheral end is circular and the outer peripheral end has a shape selected for allowing the secondary devices to tile an area in a fitted manner.

According to some embodiments of the present invention the peripheral extension comprises a plurality of protrusions extending generally perpendicular to the extension at the peripheral end.

According to some embodiments of the present invention the secondary floating device comprises to space apart rims generally parallel to an equator line of the body, and wherein the peripheral extension is constituted such as to fit into a niche formed between the rims.

According to some embodiments of the present invention the peripheral extension comprises a plurality of elastic tongs distributed around the inner peripheral end, the tongs being biased against an outer wall of the body to affix the body to the peripheral extension.

According to some embodiments of the present invention the body comprises an upper circular recess and a lower circular recess, both configured such that each of at least a few of the tongue engages one of the recesses.

According to some embodiments of the present invention at least one of the secondary floating devices comprises a sleeve enclosing an opening at a pole of the secondary floating device.

According to some embodiments of the present invention the floating devices are arranged on the liquid surface to carry a construction thereon, and the method further comprises placing the construction on the floating devices.

According to some embodiments of the present invention the barrier is concave toward the second cup member.

According to some embodiments of the present invention the device further comprises a joining mechanism mounted or embedded on the connector member, for joining the device to other devices floating on a surface of the liquid adjacent thereto.

According to some embodiments of the present invention the joining mechanism comprises attracting means for establishing attractive forces between two adjacent floating devices.

According to some embodiments of the present invention the joining mechanism comprises an elongated compartment having therein a magnet and being mounted on the peripheral wall at an orientation generally perpendicularly to the base of the first cup member, the magnet being moveable along the compartment.

According to some embodiments of the present invention the joining mechanism further comprises an elongated metallic element mounted on or formed in the peripheral wall at an orientation generally perpendicularly to the base of the first cup member.

According to some embodiments of the present invention the barrier is constituted such as to prevent accumulation of the liquid in the second cup member.

According to some embodiments of the present invention the device is characterized by a height to diameter aspect ratio of at least 0.5.

According to some embodiments of the present invention the device further comprises a hat member having a generally conical shape and being mounted on a base of the second cup member such that an apex of the hat member is distal with respect to the base. According to some embodiments of the present invention the device is characterized by a height to diameter aspect ratio of at least 0.8.

According to some embodiments of the present invention a height of the apex above a surface of the liquid is at least 50 centimeters.

According to some embodiments of the present invention the hat member is rotatable about a symmetry axis thereof.

According to some embodiments of the present invention the hat member comprises a plurality of blades mounted on an external surface of the hat member such as to form a rotatable vane.

According to some embodiments of the present invention the blades are detachable from the conical shape.

According to some embodiments of the present invention the device further comprises a rotatable vane mounted on the hat member.

According to some embodiments of the present invention the vane is mounted externally on the hat member.

According to some embodiments of the present invention the vane is a wind vane.

According to some embodiments of the present invention the wind vane is mounted internally on the hat member.

According to some embodiments of the present invention the vane is a wind vane and wherein hot internal air propels the wind vane.

According to some embodiments of the present invention the vane is configured to generate sound during rotary motion of the vane.

According to some embodiments of the present invention the sound is generated by a plurality of foils mounted on the vane.

According to some embodiments of the present invention the blades of the vane comprise openings and wherein the sound is generated by air passing through the opening during rotary motion of the vane.

According to some embodiments of the present invention the device further comprises a solar panel for collecting solar energy during floating of the device.

According to some embodiments of the present invention the first and the second cup members are connected to the connector member via disassemblable coupling elements.

According to some embodiments of the present invention the first and the second cup members have similar shapes, to allow stacking of first and the second cup member when the device is not assembled in a manner such that an open end of one of the cup members receives a base of another cup member.

According to an aspect of some embodiments of the present invention there is provided a generally spherical floating device. The generally spherical floating device comprises a hollow body formed with a plurality of openings and having therein a solid absorbent occupying a portion of a volume enclosed by the body wherein a complementary volume is filled with air.

According to some embodiments of the present invention the solid absorbent occupies at least a lower hemisphere of the body, and wherein the openings are distributed below an equator defining the hemisphere.

According to an aspect of some embodiments of the present invention there is provided a generally spherical floating device. The device comprises a hollow body formed with a plurality of openings, and a separator member generally near an equator of the body, wherein at least some of the openings are arranged near the separator member and, at least one of the openings is at a pole the hollow body.

According to an aspect of some embodiments of the present invention there is provided a generally spherical floating device. The device comprises a ball-like structure made of a solid absorbent material and being partially coated by a water resistant dome.

According to an aspect of some embodiments of the invention the present invention there is provided a floating device. The device comprises a generally spherical hollow body having a first hemisphere and a second hemisphere, the first and the second hemispheres being connectable to each other by a plurality of snap connectors; and a floating member disposed within an anterior of the body approximately at or near an equator line of the body.

According to some embodiments of the invention the floating member is selected such that there is at least one gap between the floating member and the body.

According to some embodiments of the invention the body is formed with a plurality of openings distributed peripherally on each hemisphere such that when the hemispheres are assembled, openings of the first hemisphere are azimuthally shifted with respect to openings of the second hemisphere.

According to some embodiments of the invention the body is formed with a plurality of openings each being located behind one of the connectors.

According to some embodiments of the invention the device comprises a plurality of internal wings arranged at the anterior of the body at or near the equator line such as to facilitate circulation of air entering the anterior through at least some of the openings.

According to some embodiments of the invention the device comprises a plurality of external wings distributed on external surface of the body, such as to allow winds to rotate the body.

According to some embodiments of the invention the device comprises an external peripheral extension surrounding the body, the peripheral extension having an inner peripheral end being in proximity or in contact with the body and an outer peripheral end being farther from the body.

According to some embodiments of the invention the inner peripheral end is circular and the outer peripheral end has a shape selected for allowing a plurality of similar extensions to tile an area in a fitted manner.

According to some embodiments of the invention the peripheral extension comprises a plurality of protrusions extending generally perpendicular to the extension at the peripheral end.

According to some embodiments of the invention each of the first hemisphere and the second hemisphere comprises a rim generally parallel to an equator line thereof such that when the first and the second hemisphere are assembled a niche formed between the rim of the first hemisphere and the rim of the second hemisphere, and wherein the peripheral extension is constituted such as to fit into the niche.

According to some embodiments of the invention the peripheral extension comprises a plurality of elastic tongs distributed around the inner peripheral end, the tongs being biased against an outer wall of the body to affix the body to the peripheral extension.

According to some embodiments of the invention each of the first and second hemispheres comprises a circular recess configured such that each of at least a few of the tongue engages one of the recesses.

According to some embodiments of the invention the device comprises an internal sleeve enclosing an opening at a pole of the body.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a schematic illustration of a plurality of cup members stacked for storage and/or transportation;

FIGS. 3A-C are schematic illustrations showing a self-righting property of the floating device according to various exemplary embodiments of the present invention;

FIG. 3D is a schematic illustrations showing influx and efflux of liquid to and from the floating device according to various exemplary embodiments of the present invention;

DESCRIPTION OF SPECIFIC EMBODIMENTS OF THE INVENTION

Figure 1A:
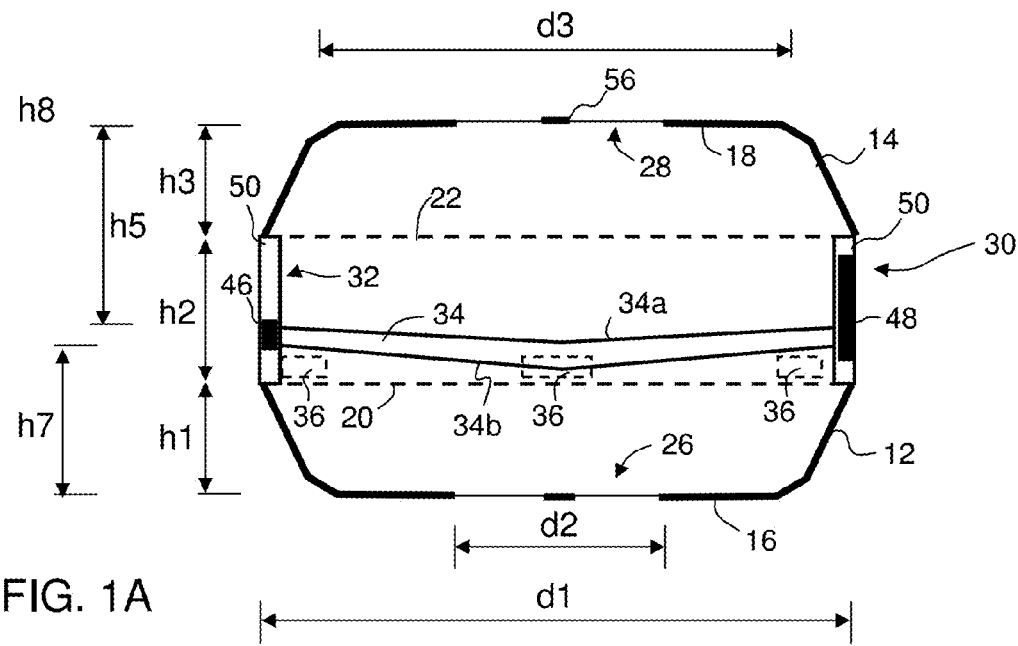
FIGS. 1A-D are schematic illustrations of a cross-sectional view (FIGS. 1A, 1C and 1D) and a top view (FIG. 1B) of a floating device, according to various exemplary embodiments of the present invention.

The present invention, in some embodiments thereof, relates to a floating device and, more particularly, but not exclusively, to a floating device that is joinable to other floating devices for the purpose of, e.g., covering a liquid surface. In some embodiments of the present invention a plurality of such floating devices are in the aquaculture industry, e.g., for reducing bird predation of underwater organisms and/or evaporation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIGS. 1A-D are schematic illustrations of a cross-sectional view (FIGS. 1A, 1C and 1D) and a top view (FIG. 1B) of a floating device 10, according to various exemplary embodiments of the present invention.

Device 10 can be used in many applications. Generally, device 10 can be used in any application in which it is desired to place a physical object on a liquid surface, e.g., in an upright position. For example, in some embodiments device 10 is used for covering, at least partially, an aquaculture pond so as to reduce bird predation; in some embodiments device 10 is used for covering a liquid surface, e.g., to reduce evaporation of liquid or any other transfer of thermal energy between the liquid and the environment; in some embodiments device 10 is used for dividing a surface of a liquid into two or more surface parts; in some embodiments device 10 is used for at least partially carrying a construction such as, but not limited to, a dock or a floating pathway; and in some embodiments device 10 is used for collecting solar energy. A more detailed description of some of these potential applications is described hereinunder. While some of the embodiments below are described with a particular emphasis to one or more specific applications for which device 10 is useful, it is to be understood that more detailed reference to such applications is not to be interpreted as limiting the scope of the invention in any way, and that other applications are not excluded from the scope of the present invention.

Figure 1B:
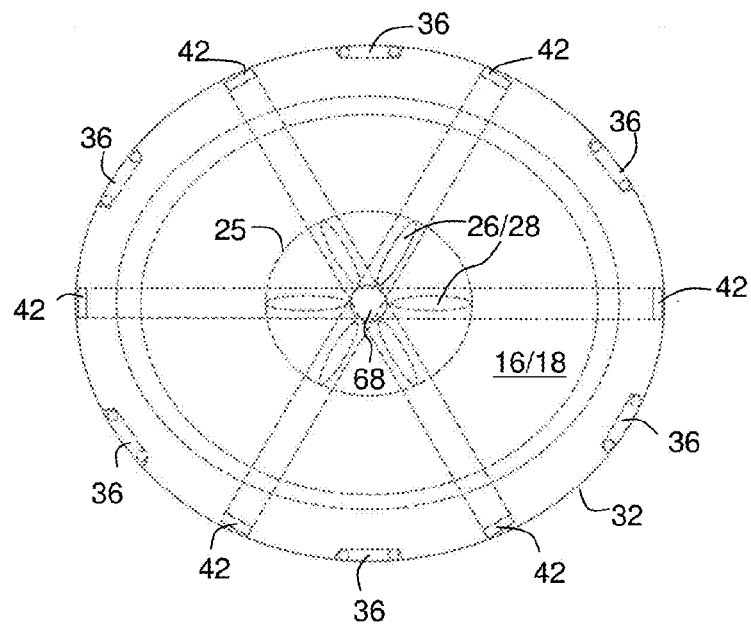

Referring now to FIGS. 1A and 1B, device 10 comprises a first cup member 12 and a second cup member 14, each having a base (16 and 18, respectively) and an open end (20 and 22, respectively). In various exemplary embodiments of the invention, first 12 and second 14 cup members have similar shapes, to allow stacking them when the device is not assembled in a manner such that an open end of one cup member receives a base of another cup member. A representative illustration of such stacking is illustrated in FIG. 2. These embodiments are advantageous from the stand point of storage and transportation efficiency. In some embodiments of the present invention cup members 12 and 14 are identical.

The heights of cup members 12 and 14 are designated by h1 and h3, respectively, the diameter of bases 16 and 18 (in the non-limiting embodiments in which both bases have the same diameter) is designated d3, and the diameter of open ends 20 and 22 (in the non-limiting embodiments in which both open ends have the same diameter) is designated d1. Typical values for h1 and h3 are from about 10 cm to about 20 cm (e.g., about 15 cm), typical values for d1 are from about 60 cm to about 100 cm (e.g., about 80 cm), and typical values for d3 are from about 42 cm to about 86 cm (e.g., about 64 cm). Other dimensions are not excluded from the scope of the present invention. Preferably, the height-to-largest-diameter aspect ratio of each cup member is from about 0.16 to about 0.2.

In various exemplary embodiments of the invention cup member 12 is formed with one or more openings 26 at a center of base 16. Optionally (e.g., in the embodiments in which both cup members 12 and 14 are identical), cup member 14 is also formed with one or more openings 28 at a center of base 18.

Any number of openings 26 in any shape can be formed. In the representative illustration shown in FIG. 1B, six openings 26 are formed at base 16. The openings have an oval shape and they can be arranged circularly within a circular region 25 about the center of base 16, such that the major axis each oval is oriented radially. In embodiments in which cup member 14 also includes openings 28, they can be arranged similarly to opening 26 but on base 18.

The diameter d2 of the circular region occupied by the openings is typically from about 27 cm to about 30 cm (e.g., about 28.5 cm), but other dimensions are not excluded from the scope of the present invention.

Device 10 further comprises a connector member 30, having a peripheral wall 32 fittingly connected to open ends 20 and 22 and enclosing a curved barrier 34.

Barrier 34 preferably has a concave side 34a and optionally also an opposite convex side 34b. Convex side 34b is facing end 20 of member 12, and concave side 34a is facing end 22 of member 14.

As used herein "concave side of a surface" refers to the side at which the normal lines to surface converge, and "convex side of a surface" refers to the side at which the normal lines to surface diverge.

The height h2 of peripheral wall 32 is typically from about 15 cm to about 25 cm (e.g., about 20 cm), but other dimensions are not excluded from the scope of the present invention. The highest vertical distance h7 between barrier 34 and base 16 of member 12 is from about 18 cm to about 22 cm (e.g., about 20 cm), and the lowest vertical distance h5 between barrier 34 and base 18 of member 14 is from about 25 cm to about 29 cm (e.g., about 27 cm), but other vertical distances are not excluded from the scope of the present invention.

Herein, "vertical" refers to a direction perpendicular to base 16 of member 12, and "horizontal" refers to a direction perpendicular to the vertical direction (i.e., parallel to base 16.

Preferably, but not necessarily, device 10, including members 12, 14 and 30 is characterized by a height to diameter aspect ratio of at least X, where X is about 0.5 or about 0.6, e.g., about 5:8.

Figure 1C:
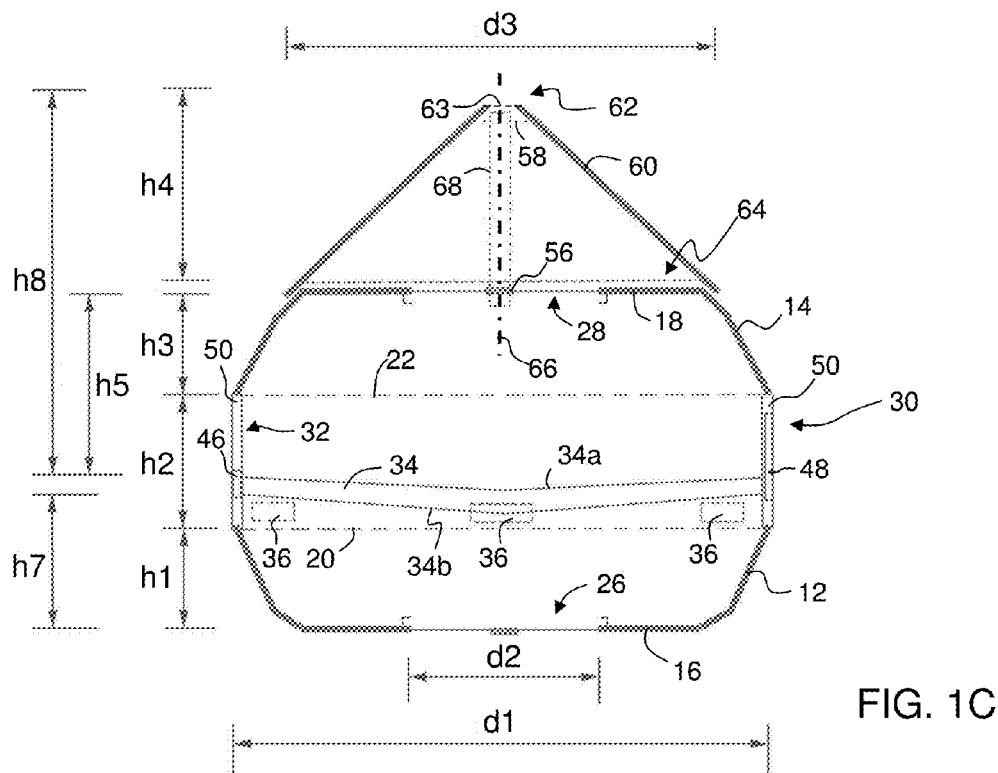
Figure 1D:
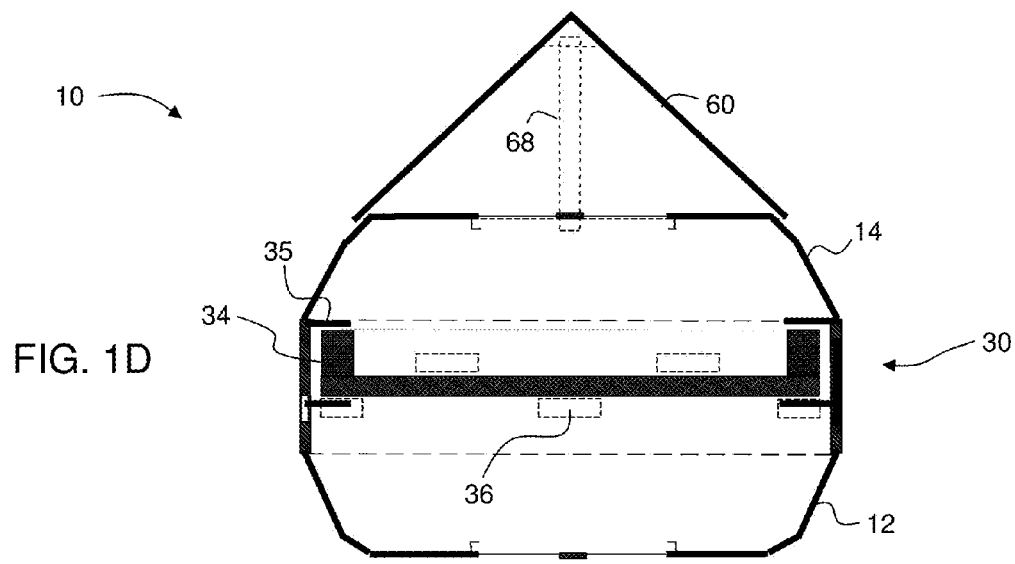

FIG. 1D is a schematic illustration of a variant of the device shown in FIG. 1C. In FIG. 1D, barrier 34 is a floating barrier which is maintained in its position by means of stopping members 35. In some embodiments of the present invention stopping members 35 are shaped as wings such as to circulate air within device 10. Representative examples of wings for circulating air are described below with reference to FIG. 16H. Floating barrier 34 is made from a material having a specific weight which is lower than the specific weight of the liquid on which the device is to be placed. The material can be, for example, foamed closed-cell material including, without limitation, Polyvinyl chloride (PVC), Polystyrene, Polyethylene, Polypropylene and the like.

In various exemplary embodiments of the invention peripheral wall 32 is formed with openings 36 arranged on wall 32 between barrier 34 and first cup member 12. In some embodiments of the present invention openings are formed at both sides of barrier 34, as illustrated in FIG. 1D. Openings 36 and 26 provide device with a self-righting property.

As used herein, a device is said to have a "self-righting property" if it maintains itself in an upright orientation (generally parallel to the direction of earth gravitation force), regardless of the orientation at which it was positioned on a surface of a liquid.

The self-righting property of device 10 will now be explained with reference to FIGS. 3A-C. When floating device 10 contacts a surface 40 of a liquid (e.g., water), the liquid enters through openings 36 into first cup member 12 (FIG. 3A). The liquid that enters member 12 is shown as a diagonal line pattern. As a result of the moment applied to device 10 by gravity, cup member 12, which begins to be filled with the liquid, is submerged and cup member 14 is elevated above the liquid surface (FIG. 3B). Following the initial tilting of the device toward the upright orientation larger amount of liquid enters also through opening 26 at the base of member 12, forcing the air in member 12 to exit through openings 36. Member 12 is fully submerged and a restorable upright orientation is imparted to device 10 (FIG. 3C).

Preferably, device 10 maintains the upright orientation as long as it is on the surface of the liquid. Thus, even when some condition (e.g., waves or wind) momentarily deviates, device 10 from its upright orientation, the moment applied by gravity restores the upright orientation of device 10.

During the floating of device 10, there is an exchange of liquid between cup member 12 and the liquid at the exterior of device 10. Influx and efflux of liquid into and out of device 10 is illustrated by block arrows in FIG. 3D. Typically, the influx is through opening 26 and the efflux is through openings 36. This exchange of liquid can be exploited according to some embodiments of the present invention for filtration. In these embodiments, opening 26 is covered with a filter 27 such that the liquid is filtered upon entering through opening 26. Thus, the liquid in cup member 12, hence also the liquid that exits cup member 12 through openings 36, is a filtered liquid. Filter 27 may be of any type, e.g., an activated carbon filter. This is particularly useful when device 10 is placed on water, e.g., in an aquaculture pond, since it allows filtration of chlorine, sediment and volatile organic compounds. In embodiments in which base 18 of cup member 14 comprises opening 28, a filter 29 can also cover this opening. Filter 29 can be of the same type as filter 27 (e.g., when members 12 and 14 are identical), or it can be of a different type. Filter 29 can be used for preventing small insects from penetrating into device 10.

In various exemplary embodiments of the invention barrier 34 is constituted such as to prevent accumulation of liquid in second cup member 14. These embodiments are illustrated in FIGS. 3A-C wherein barrier 34 seals the part of member 30 that is facing end 20 and prevents the liquid from entering into the other part of member 30 (the upper part in FIGS. 3B and 3C) and into and cup member 14. Thus, in use, device 10 floats such that barrier 34 is approximately leveled with surface 40 of the liquid, and the height of base 18 of second cup member 14 above liquid surface 40 is h5.

The concave side 34a of barrier 34 serves for guiding condensed liquid that is trapped above barrier 34 to the center of barrier 34 preventing or reducing misbalancing. The convex side 34b serves for guiding air that is trapped in cup member 12 to openings 36.

In some embodiments, device 10 is capable of supporting relatively high weights without being submerge. It was found by the present Inventor that device 10 can be constructed to allow supporting of more than 100 Kg. This is particularly advantageous in embodiments in which device 10 is used for supporting a constructions, such as a dock or a floating pathway.

Figure 4:
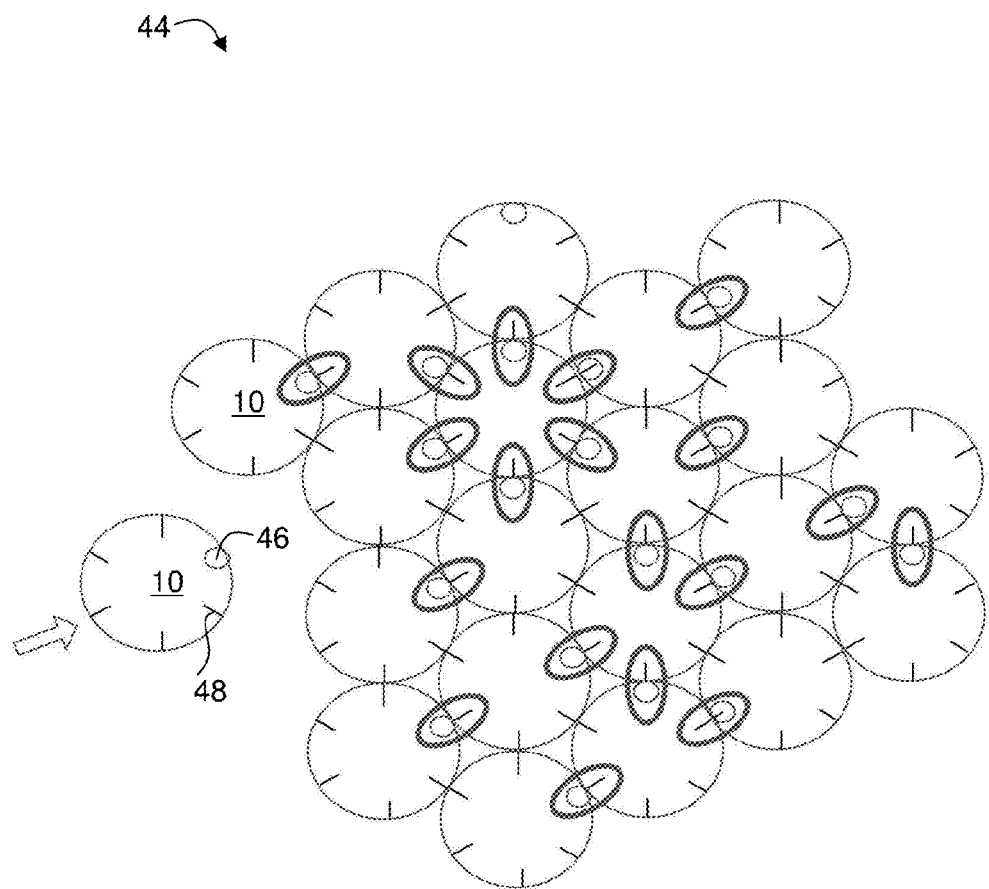
FIG. 4 is a schematic illustration of a floating assembly which comprises of several floating devices, according to various exemplary embodiments of the present invention.

Device 10 optionally comprises a joining mechanism 42 mounted or embedded on connector member 30, for joining device 10 to adjacent devices that float on the surface. Optionally, mechanism 42 comprises attracting means for establishing attractive forces between two adjacent floating devices. For example, mechanism 42 can be a magnet and/or unmagnetized metallic elements that are attractable to magnets on adjacent devices. Joining mechanism 42 preferably allows the device to self-assemble on the surface of the liquid to form a floating assembly. A schematic illustration of a floating assembly 44 of several floating devices is shown in FIG. 4. Some or all of the floating devices in assembly 44 are similar to device 10 described above. In the non-limiting example of FIG. 4, the joining mechanism 42 comprises a magnet 46 and an unmagnetized metallic element 48. A magnet of one device attracts a metallic element of an adjacent device thereby forming a bond between the two devices. Such bonds are illustrated by ovals in FIG. 4. For example, the magnet of the leftmost device in FIG. 4 applies attractive magnetic forces between the left most device and assembly 44, thereby establishing a translation motion of the leftmost device toward assembly 44 to bind one of the already assembled devices.

The metallic elements and magnets can be distributed on peripheral wall 32 of member 30 (not specifically shown in FIG. 4, see FIGS. 1A and 1B). In some embodiments of the present invention the metallic elements and/or magnets are placed in compartments 50 formed in wall 32. In the example illustrated in FIG. 4, each device 10 comprises six joining elements, one magnet 46 (shown as a circle) and five metallic elements 48 (shown as short linear segments), arranged circumferentially at generally equal spacing from each other. Other configurations are not excluded from the scope of the present invention. For example, device 10 can include more than one magnet and/or more or less than six joining elements and/or non-equal spacing between the joining elements.

It was nevertheless found by the present inventor that it is advantage to have the number of magnets smaller than the number of metallic elements, for example, one magnet with all the other joining elements being non-magnetic metallic elements. One advantage is that it reduces the cost of the device without compromising the self-assembly property. Another advantage is that a small number of magnets per device increases the probability of pairing between the magnets and the other elements. Thus, once the devices are self-assembled, most or substantially all the magnets located between two devices and are paired with other elements. The number of unpaired magnets is therefore very small or zero. In the representative illustration of FIG. 4, for example, all but one magnet (see left topmost device) in assembly 44 are paired. Small number of unpaired magnets is advantageous since unpaired magnets, particularly unpaired magnet at the outermost border of the assembly may tend to attract foreign objects.

In various exemplary embodiments of the invention the magnet has a predetermined polarity, such as to ensure repulsion between magnets of different devices in the assembly.

Magnet 46 can be of any type. Preferably, magnet 46 is a permanent magnet, such as, but not limited to, a neodymium magnet, but electromagnets are not excluded from the scope of the present invention. When a combination of magnets and unmagnetized metallic elements is employed, the weight of the magnet is preferably the same (e.g., within 20% deviation) as the weight of the metallic element so as to avoid misbalancing.

Figure 5:
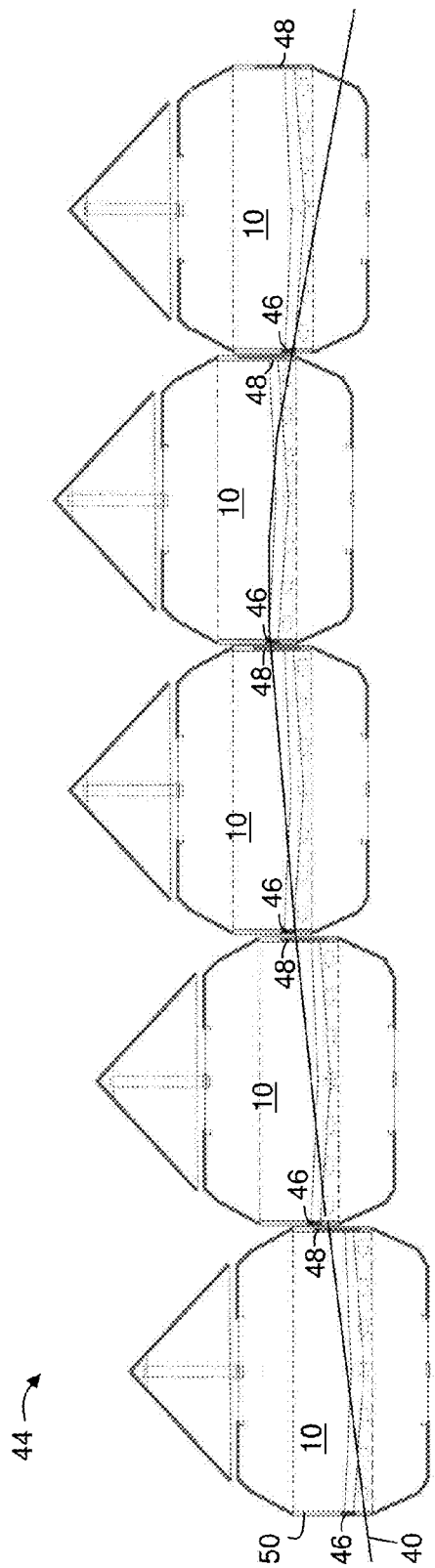
FIG. 5 is a schematic illustration of floating devices assembled over a non-planar liquid surface, according to some exemplary embodiments of the present invention.

In some embodiments, the unmagnetized metallic elements 48 are elongated metallic elements, e.g., metallic strips. The metallic stripes are preferably arranged on wall 32 along the vertical direction. The metallic stripes can be attached to or formed with wall 32 or they can be placed within elongated compartments 50 mounted on wall 32. Magnet 46 can be placed in a vertical elongated compartment similar to compartments 50 and can be allowed to move, e.g., slide, within the elongated compartment along the vertical direction. This configuration allows for adjacent devices to join and preserve the bond even when they are at different vertical levels. A representative example is illustrated in FIG. 5. Shown in FIG. 5 is a liquid surface 40, for example, water, which is non-planar, for example a water wave. Devices 10 of assembly 44 are joined thereamongst by a magnet 46 on one device and a metallic stripe 48 on the adjacent device. Although devices 10 float at different levels they remained assembled since the attractive magnetic forces between magnets 46 and stripes 48 establish motion of magnets 46 within the compartments 50 towards the strips thereby maintaining the bond between adjacent devices and prevent or reduce their detachment.

The height of compartments 50 can be approximately the same as the height h2 of member 30. The diameter of compartments 50 is typically but not necessarily from about 2 cm to about 5 cm. Compartments 50 can be made of any material. Preferably, compartments 50 are made of a material that does not screen the magnetic field generated by magnet 46.

Device 10 can also facilitate physical joining between adjacent devices. For example, as illustrated in FIGS. 6A-D, one or more hook receiving elements 52 can be formed near openings 36 of member 30. Each hook receiving element 52 is preferably formed at the inner side of wall 32 behind the lower part of openings 36, and is constituted to receive a hook element 54 which may be provided separately. Hook element 54 is optionally a symmetric double hook to allow hook receiving element 52 to receive any of its ends 54a and 54b. Although hook receiving element 52 is shown cylindrical in FIG. 6A, this need not necessarily be the case since it may be of any other shape, provided hook element 54 can be hooked thereon.

Figure 6A:
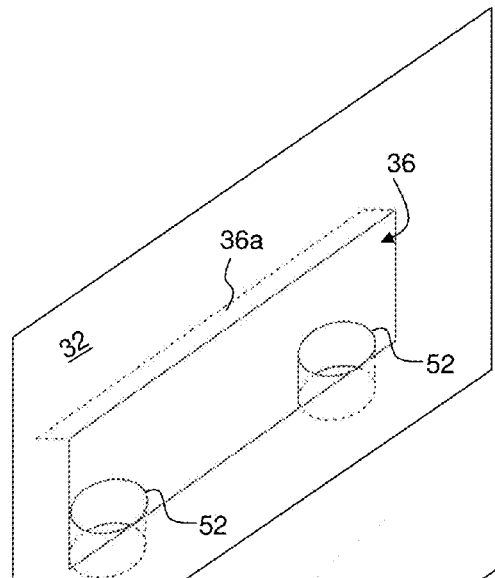
FIGS. 6A-D are schematic illustrations of a hook element and a hook receiving element, according to some embodiments of the present invention.
Figure 6B:
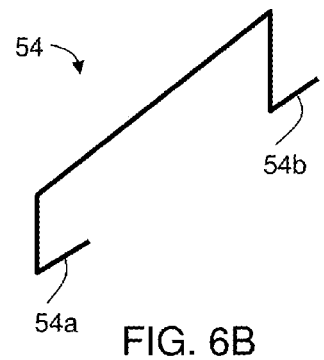
Figure 6C:
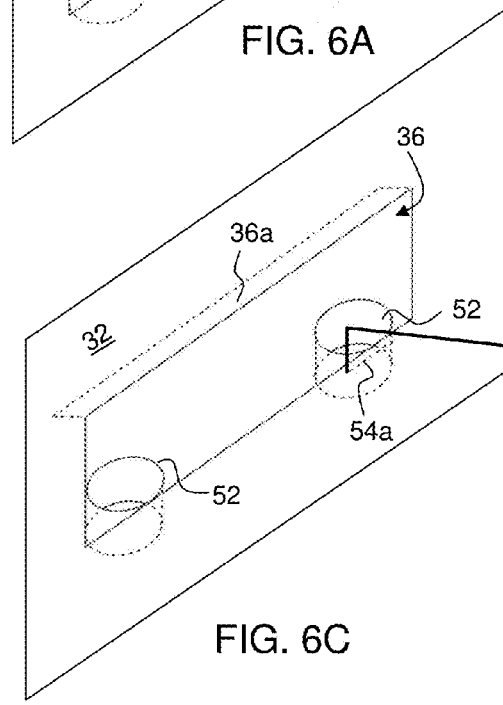
Figure 6D:
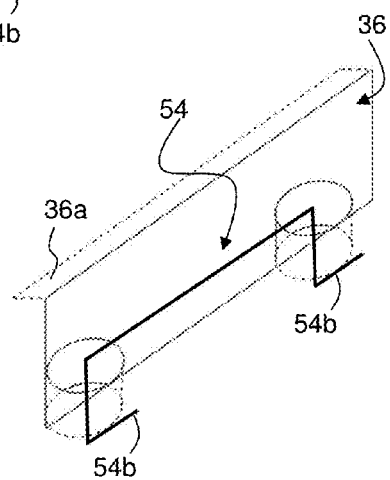

Use of hook element 54 for manually joining two floating devices is illustrated schematically in FIG. 6C. One end 54a of element 54 is hooked on a hook receiving element 52 of one floating device, and the other end 54b is hooked on hook receiving element of an adjacent device (the other device not shown for clarity of presentation). Another optional use of hook element 54 is illustrated in FIG. 6D. As shown, ends 54a and 54b are hooked on hook receiving elements formed at the same opening 36. This is useful for storage purpose and/or for connecting device 10 to other objects, such as covering sheets or nets.

In any of the embodiments of the present invention, the shape of openings 36 is preferably selected to allow easy and convenient grip on device 10. In the illustrative examples of FIGS. 6A, 6B and 6C, opening 36 is generally rectangular, with the upper part 36a folded inward.

In various exemplary embodiments of the invention device 10 comprises a hat member 60 having a generally conical shape and being mounted on base 18 of second cup member 14 such that an apex 62 of hat member 60 is distal with respect to base 18. Hat member 60 can comprise a shaft 68 connected to a supporting plate 58 mounted on the anterior of member 60. Connection between hat member 60 and cup member 14 can be established by mounting shaft 68 on a shaft receiving ring 56 on base 18. Hat member may optionally comprise one or more openings 63 near or at apex 62. It was found by the present inventor that such opening facilitates evacuation of hot air from device 10 and reduces heating of the liquid surface by heat conduction.

The use of hat member 60 is particularly useful, for example, when device 10 is used for covering an aquaculture pond, since it reduces or eliminates the problem of bird predation, by denying a foothold for birds and providing fish with a shelter to hide under.

With the increment of seafood consumption and the consequent depletion of naturally occurring sources of seafood, there is a growing need to fill the demand for seafood by turning to aquaculture. A major concern in aquaculture is bird predation of fish. A large bird, such as a Heron or a Cormorant consumes almost one fish per day and a large flock of such birds can empty a fish farm. A large bird needs also a relative flat surface to stand on and a "runway" for takeoff.

The height-to-diameter aspect ratio of hat member 60 is preferably sufficiently large (e.g., at least 0.5 or at least 0.6 or at least 0.7 or at least 0.8 or at least 0.9 or at least 1 or at least 1.5 or at least 2) so as to prevent large birds from landing on hat member 60. The external surface of hat member is preferably smooth. To prevent predation of fish by smaller birds that are capable of standing on sharp edges, apex 62 is preferably sufficiently high above surface 40 of the liquid. The height (from base 64 to apex 62) of hat member 60 is denoted h4 (FIG. 1A), and when device 10 is placed on liquid surface 40, the height of apex 64 above surface 40 is approximately h4+h5. h4 is typically from about 27 cm to about 30.6 cm (e.g., about 28.8 cm), but other dimensions are not excluded from the scope of the present invention. The diameter of hat member 60 at its base 64 is approximately the same (e.g., within 20%) as the diameter of base 18 of cup member 14, so as to allow compete coverage of base 18 by hat member 60.

When device 10 is provided with hat member 60, the overall height-to-diameter aspect ratio of device 10, including members 12, 14, 30 and 60 is at least X, where X is about 0.7 or about 0.75 or about 0.8 or about 0.85, or about 0.9, or about 0.95.

Figure 7:
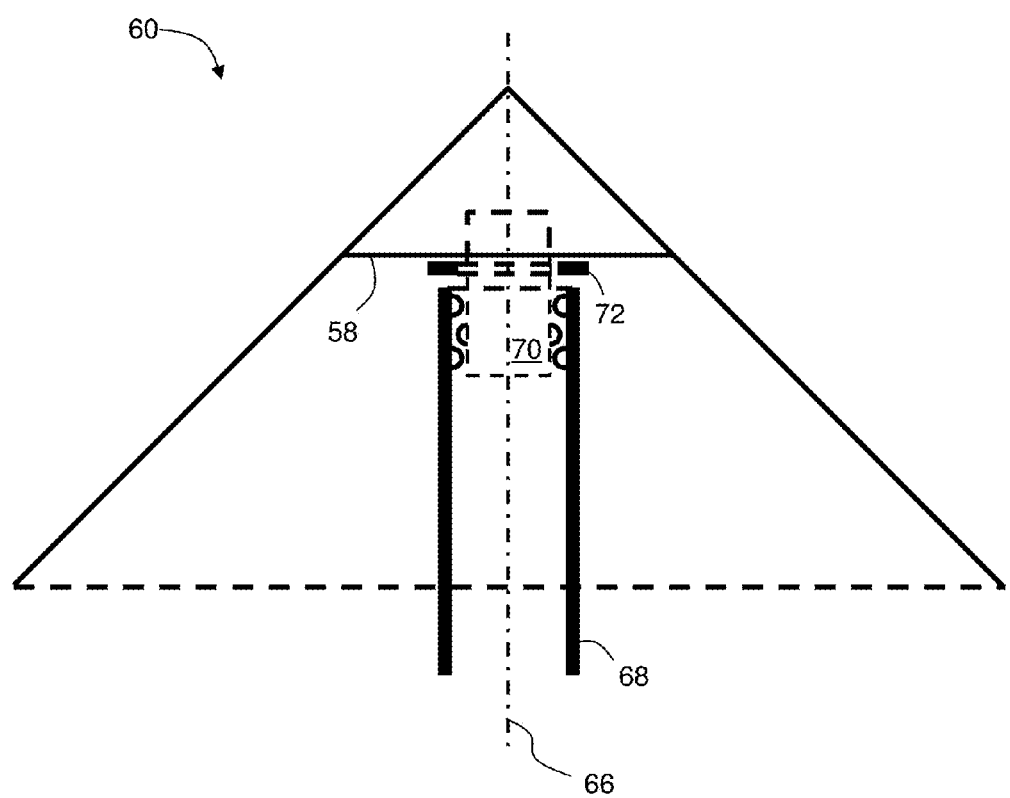
FIG. 7 is a schematic illustration of a rotatable hat member, according to some embodiments of the present invention.

The present inventor devised further means for preventing birds from standing on hat member 60. In some embodiments of the present invention hat member 60 is rotatable about a symmetry axis 66 thereof. This can be done using any known structure capable of allowing rotary motion about an axis. A representative example is illustrated in FIG. 7, showing hat member 60 mounted via a friction ring 72 on a shaft 68 equipped with a turning mechanism 70 such as a bearings system.

Figure 8A:
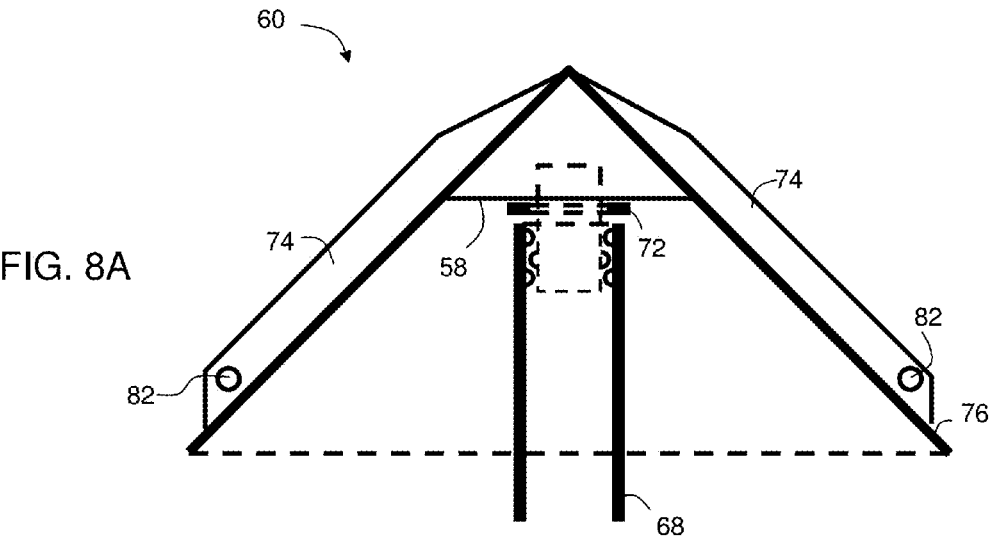
FIGS. 8A and 8B are schematic illustrations of a cross-sectional view (FIG. 8A) and a top view (FIG. 8B) of a hat member in embodiments of the present invention in which the hat member comprises blades.
Figure 8B:
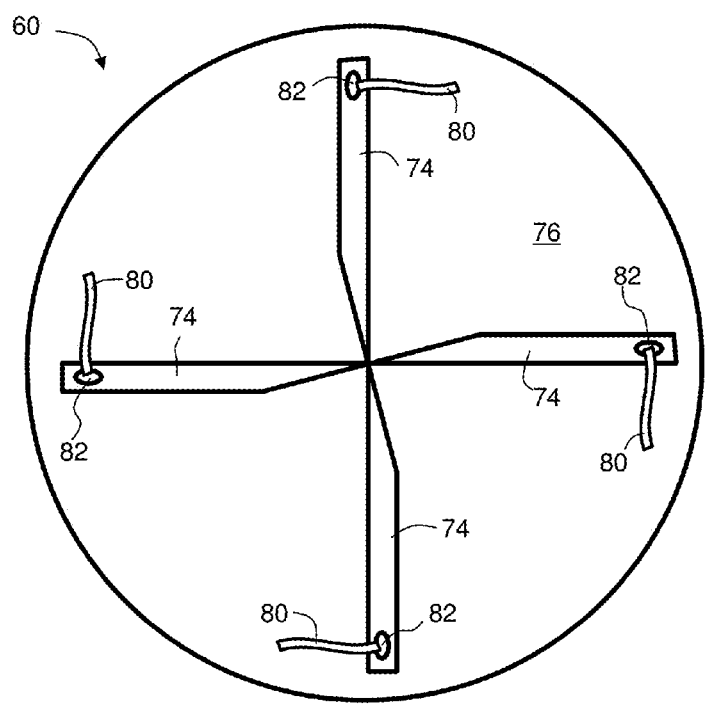
Figure 9:
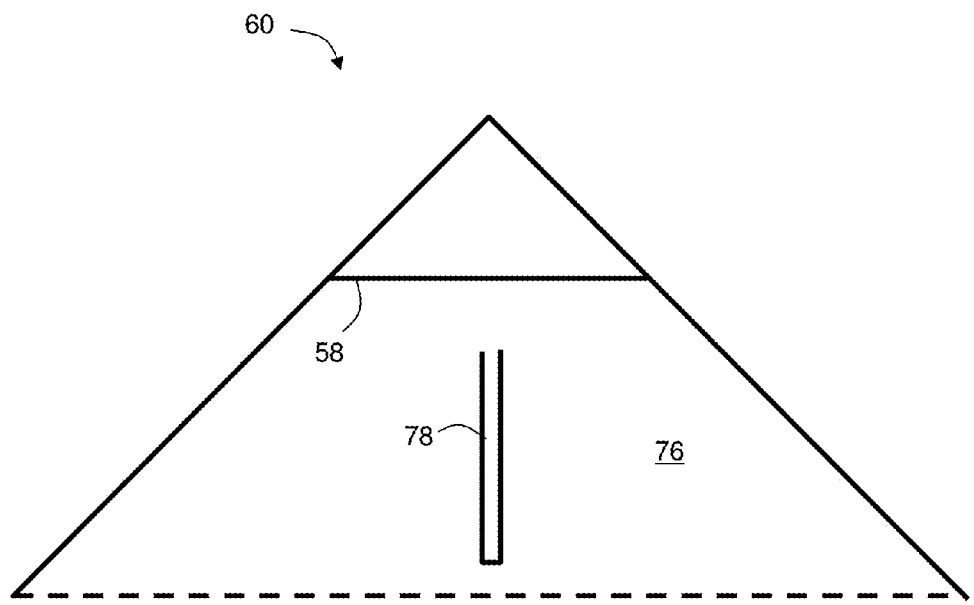
FIG. 9 is a schematic illustration of the hat member in embodiments of the present invention in which the hat member comprises slots for receiving the blades.
Figure 10:
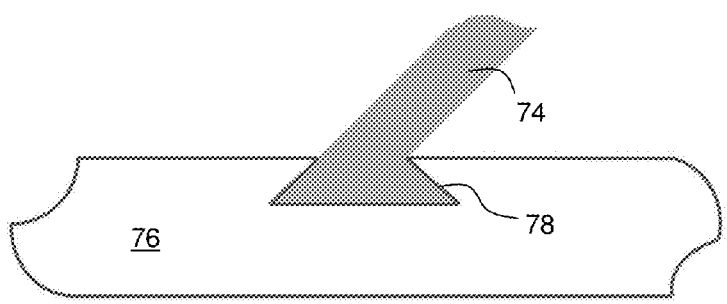
FIG. 10 is a schematic illustration of a profile of a slot into which a blade can be fitted, according to some exemplary embodiments of the present invention.

Preferably, the rotation of member 60 is actuated by wind. For example, hat member 60 can comprises a plurality of blades 74 mounted on its external surface 76 such as to form a rotatable vane. This embodiments is illustrated in FIGS. 8A (cross-sectional view) and 7B (top view). The blades can be detachable from the conical shape of member 60. For example, as shown in FIG. 9, the surface of the conical shape can be provided with slots 78 into which blades 74 (not shown in FIG. 9, see FIGS. 8A and 8B) can be fitted, e.g., on site. FIG. 10 schematically illustrates an exemplified profile of slot 78 into which blade 74 is fitted.

Also contemplated are embodiments in which a rotatable vane is mounted on hat member 60. The vane can be mounted externally or internally on hat member 60. Although an internal rotatable vane is not specifically illustrated in the drawings, one of ordinary skills in the art, provided with the details described herein would know how to adjust the drawings (e.g., FIG. 8A) to show an internal rotatable vane. When the internal vane is a wind vane (i.e., wind-actuated vane), hot air from members 30 and 14 propel the vane.

Additional means for keeping birds away from device 10 include generating sound, e.g., during the rotary motion of blades 74. For example, as shown in FIG. 8B, blades 74 can be provided with foils 80 mounted thereon, e.g., via openings 82. During the rotation of the blades, foils vibrate and generate a sound wave. Additionally or alternatively, openings 82 of blades 74 can be formed such that the sound is generated by air passing through openings 82 during the rotary motion of vane.

Figure 11:
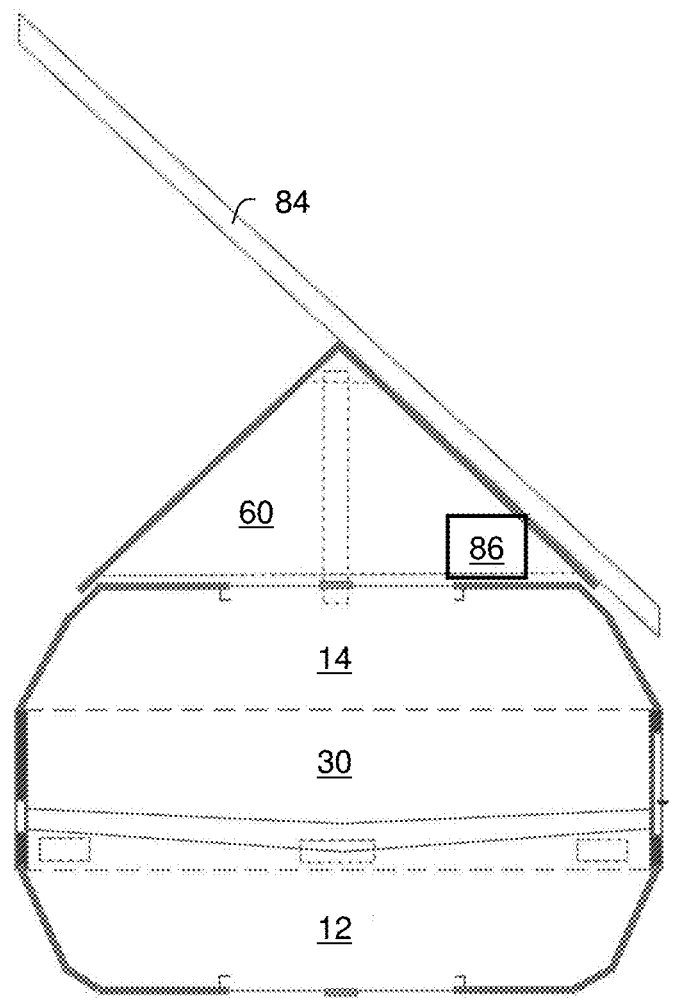
FIG. 11 is a schematic illustration of a floating device in embodiments of the invention in which the device comprises a solar panel.

In some exemplary embodiments of the invention, device 10 comprises a solar panel 84. A representative example of these embodiments is illustrated in FIG. 11. As shown, solar panel is mounted in a slanted orientation to maximize collection efficiency of solar energy. For example, panel 84 can be mounted on the surface of hat member 60. Device 10 may also comprise an energy receiving module 86 configured for receiving and handling the energy collected by panel 84. Panel 84 may convert the solar energy to electricity in which case module 86 receives energy in the form of electrical current. Alternatively, panel can transmit thermal energy to module 86. All these operations are well known to those skilled in the art of reusable energy.

The connection between the various members of device 10 can be of any type, including, without limitation, thread, snap, tracks, pin and groove, slip, latch and bolt. Any of the members 12, 14, 30 and/or 60 can be connected in a disassemblable manner so as to allow the user to assemble and disassemble the device as desired.

Members 12, 14, 30 and/or 60 can be made of any material. Ideally, the material is resistant to harsh weather conditions, provides durability and lightness, and is sufficiently flexible to withstand small collisions with adjacent devices. In various exemplary embodiments of the invention the material is non-toxic to humans, animals and the environment. In some embodiments of the present invention a plastic material is used. Representative examples for materials suitable for the present embodiments, include, without limitation, polythene (PE), polypropylene (PP), high density polyethylene (HDPE), polyethylene terephthalate (PET), polyethylene terephthalic ester (PETE), polyvinyl chloride (PVC), unplasticized PVC (UPVC), chlorinated PVC (CPVC), acrylonitrile butadiene styrene (ABS), glass reinforced plastic (GRP). Optionally, the material is supplemented with a UV stabilizer.

Figure 12:
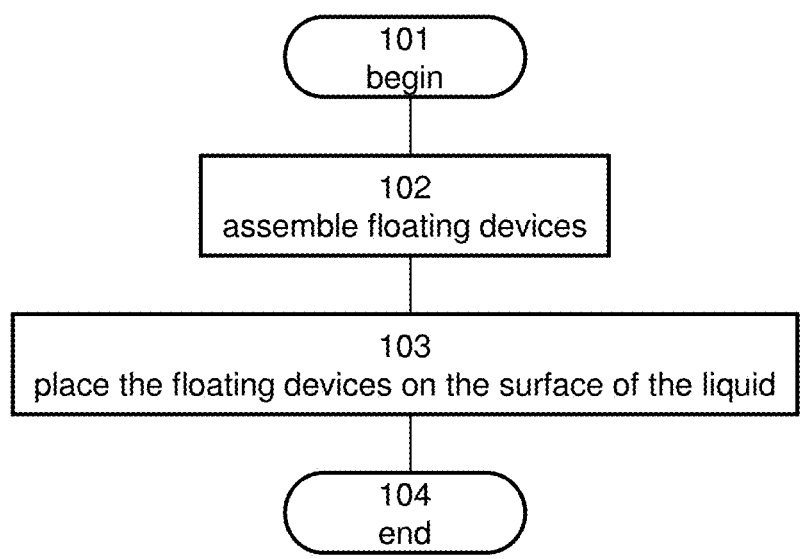
FIG. 12 is a flowchart diagram of a method suitable for covering or partially covering a liquid surface, according to various exemplary embodiments of the present invention.

Reference is now made to FIG. 12, which is a flowchart diagram of a method 100 suitable for covering, at least partially, a liquid surface, according to various exemplary embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Figure 13:
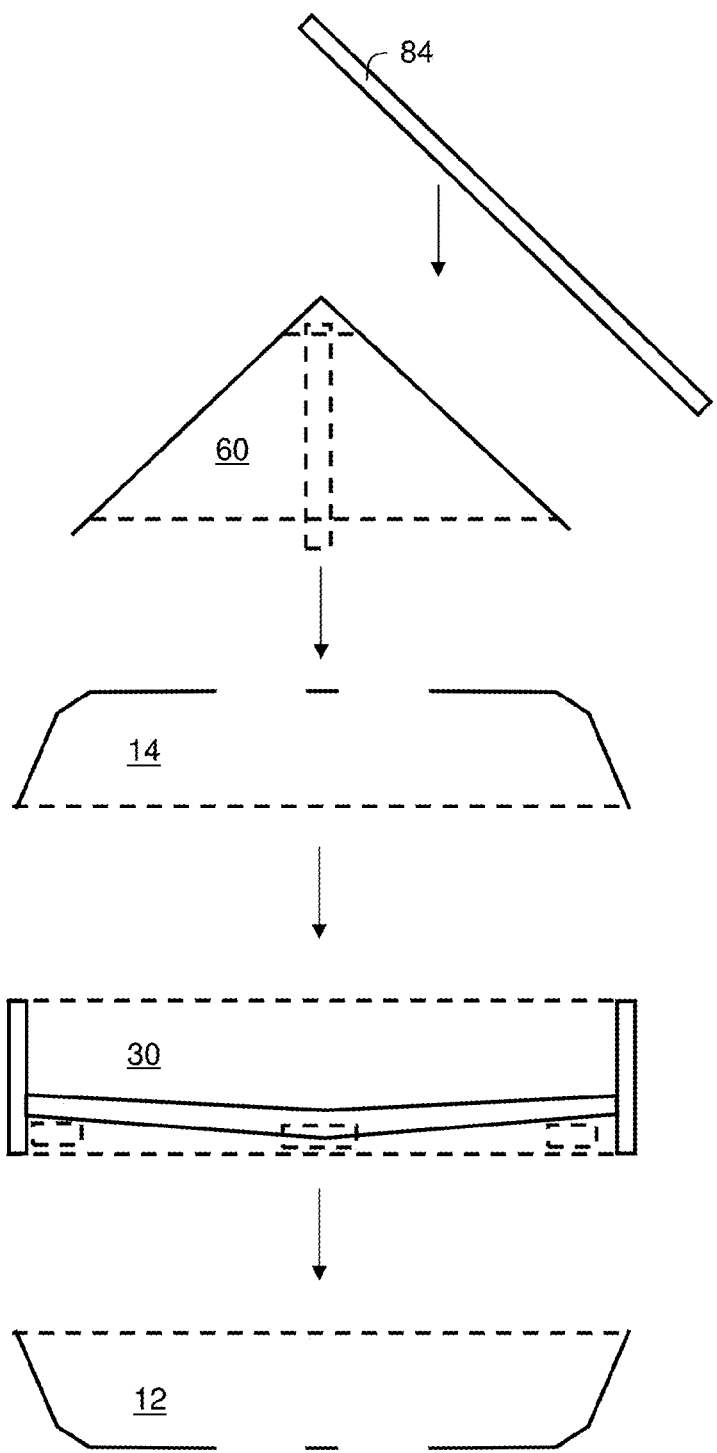
FIG. 13 is a schematic exploded view diagram illustrating a procedure for assembling a floating device, according to some embodiments of the present invention.

The method begins at 101 and optionally and preferably continues to 102 at which one or more floating devices are assembled. The floating devices can include any of the members of device 10 described above. The procedure for assembling the devices is schematically illustrated as an exploded view diagram in FIG. 13. For example, the open ends of cup members 12 and 14 can be fittingly connected to the peripheral wall of member 30. In embodiments in which it is desired to have a floating device with a hat member, hat member 60 can be connected to the base of cup member 14, and in embodiments in which it is desired to collect solar energy, panel 84 can be mounted, e.g., on hat member 60. The connection between the various members can be by any of the aforementioned types of connections.

The floating device can be assembled by the user on-site or it can be assembled at a remote location. Alternatively, the floating device can be provided as a single, already assembled, unit. At 103 the floating device(s) is/are placed on the surface of the liquid. The method ends at 104.

Method 100 can be executed in a variety of ways. For example, when it is desired to cover aquaculture pond, e.g., to reduce bird predation or exchange of energy between the liquid and the environment, the floating devices are placed on the liquid and are allowed to self-assembled into a floating assembly which preferably covers large portion (e.g., at least 70% or at least 80% or at least 90%) of the pond's surface. For such application, the floating devices preferably include further means for deterring the birds, e.g., vanes and optionally sound generating vanes. For aquaculture pond, the devices can be made partially or fully opaque for limiting the amount of light that enters the pond, thereby decreasing fish activity and increasing biomass of fish. Reduced light also reduces the rate of algae growth in the pond. Optionally, one or more fishing nets for collecting fish are attached to the floating devices. The nets can be connected to hook elements 54 (see, e.g., FIG. 6D).

It is oftentimes desired to cover a liquid surface so as to limit its exposure to the environment. For example, in aquaculture, certain fish species require a certain temperature range in order to live and grow. Reduction of evaporation from aquaculture ponds with, e.g., water, also reduces salinity of water. Other industries in which covering of liquid surfaces is employed include, mining industry, petrochemical industry, plastic industry and the like. In the mining industry, for example, ponds are used to store water and to collect water run-off. These ponds need to be covered to protect local animal life and birds and preserve water resources. Additionally, in the mining industry and other industries, laws, regulations and environmental concerns require stringent control of fluids having pollutants and toxins; thus, evaporation of volatile solutions presents environmental and financial concerns. Evaporation is also problematic in regions permanently subjected to arid weather or areas temporarily experiencing unusual drought conditions. The reduction of evaporation or the control of energy transfer may be critical to the viability of industry in these geographical regions.

When it is desired to cover a liquid surface for reducing evaporation of liquid or transfer of thermal energy between the liquid and the environment, the devices are preferably made reflective to light to reduce the amount of heat that is delivered by radiation. This can be useful both for aquaculture pond and for other types of liquid reservoir. A thermochromatic color paint may be used to reflect heat on high temperatures (e.g., white color, silver color, etc) or absorb heat on cold weather (e.g., black, dark blue, etc.). Such paint can be triggered say at 16° C. to change color from silver or white to black. The formation of devices works also as a wind breaker further reducing evaporation. The devices can also include fluorescent material on their external surface.

Figure 14A:
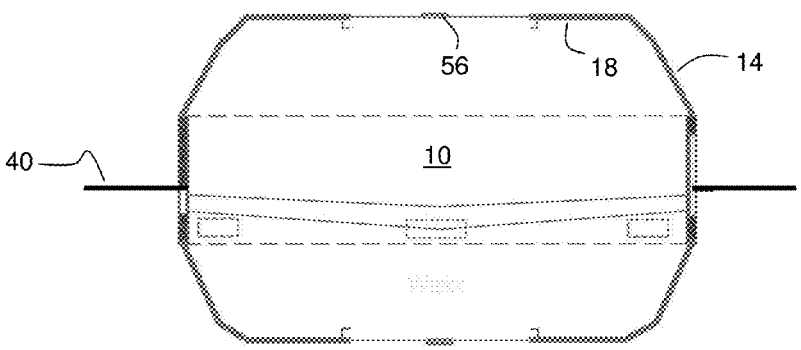
FIGS. 14A and 14B are schematic illustration of a procedure for placing a construction on a liquid surface, according to some embodiments of the present invention.
Figure 14B:
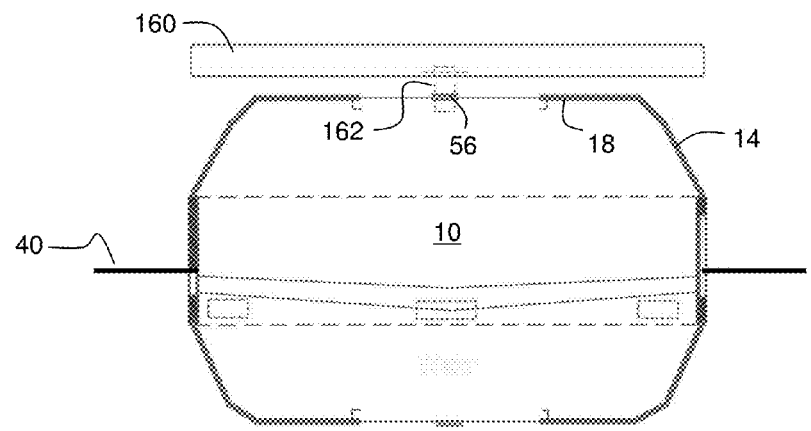

As stated, device 10 can also be used for supporting a construction, such as a dock or a floating pathway. FIGS. 14A and 14B are schematic illustrations of a procedure for building a construction on a liquid surface, according to some embodiments of the present invention. The construction can be any type of structure that is useful to place on a liquid surface, include, without limitation, a dock, a pathway, a sign, a light source, a solar panel, a raft and the like.

In the present embodiments, a plurality of floating devices such as device 10 are placed on liquid surface 40 (FIG. 14A). Thereafter, a construction 160 is placed on the floating devices. Construction 160 can comprise a shaft 162 connected to its surface. Shaft 162 can be mounted on device 10, e.g., using receiving ring 56 on base 18 of element 14. Construction 160 and/or device 10 can be equipped with a propulsion device (not shown) to allow controlled mobility of construction 160 over surface 40. This embodiment is useful, for example, when construction is a raft or the like.

In some embodiments of the present invention the floating devices are arranged on the liquid surface so as to divide the surface into two or more surface parts. These embodiments will now be explained with references to FIGS. 15A-D.

Figure 15A:
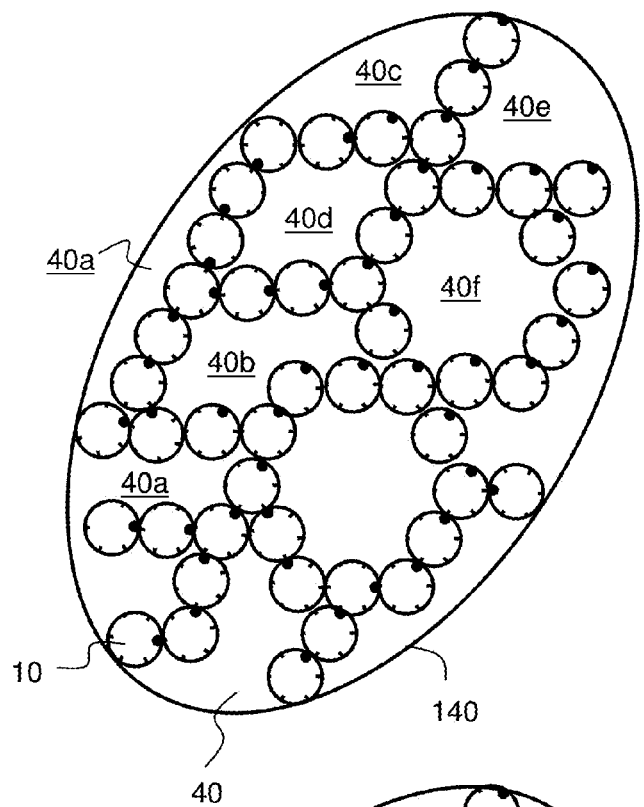
FIGS. 15A-D are schematic illustration of an arrangement of floating devices is embodiments of the present invention in which the devices are arranged to divide a liquid surface into two or more surface parts.
Figure 15B:
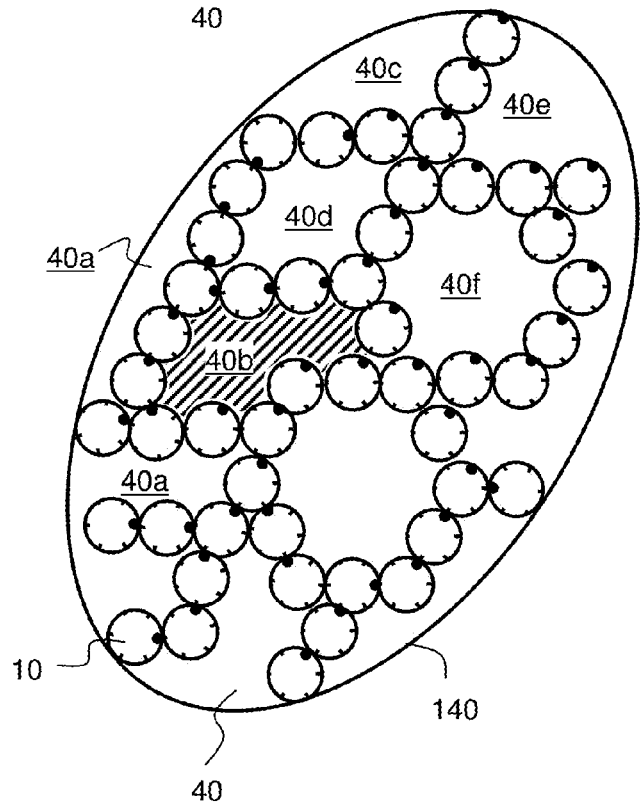

FIG. 15A is a schematic illustration of a liquid reservoir 140 having a liquid surface 40. A plurality of floating devices 10 are arranged on surface 40 in a predetermined arrangement. The arrangement is selected so as to divide surface 40 into two or more surface parts 40a, 40b, etc. One or more of the surface parts can be additionally covered. FIG. 15B illustrates reservoir 140 in an embodiment in which surface part 40b is fully covered, FIG. 15C illustrates an embodiment in which all but one of the surface parts are fully covered, and FIG. 15D illustrates an embodiment in all the surface parts are fully covered.

Figure 15C:
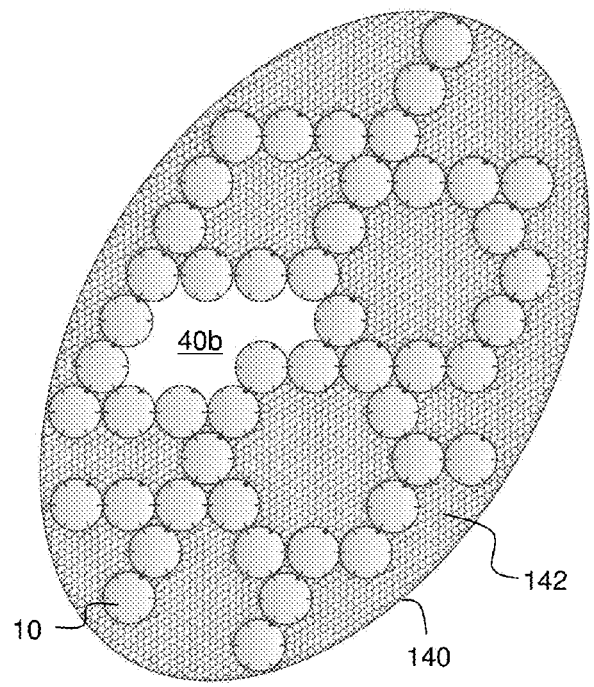
Figure 15D:
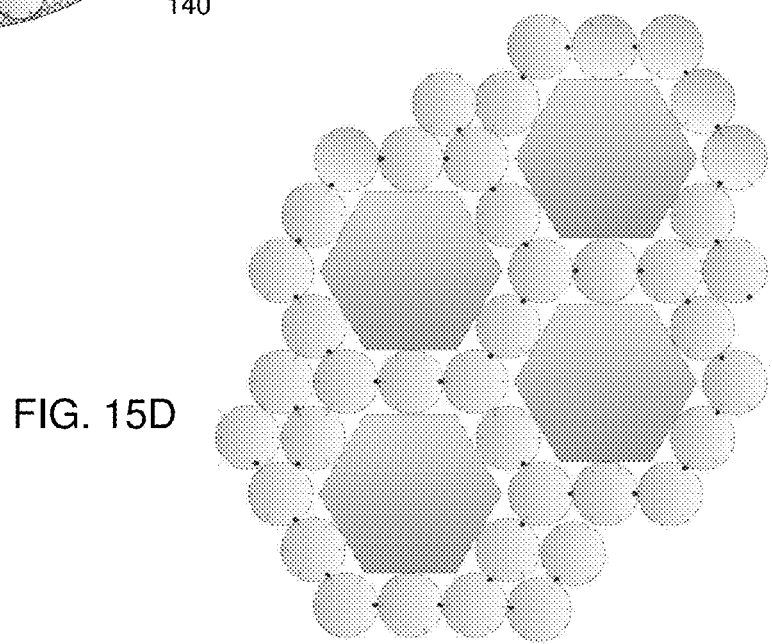

The surface parts can be covered (fully or partially) by sheets such as floating sheets, as is illustrated in FIG. 15D or by a plurality of secondary floating devices 150, as is illustrated in FIG. 15C. When sheets or floating sheets are employed, the sheets can be secured to devices 10 e.g., via hook elements 54 (not shown see, e.g., FIG. 6D).

In various exemplary embodiments of the invention device 150 has a self-righting property. Preferred types of secondary floating device 150 are illustrated in FIGS. 16A-H. In any of the embodiments described below, floating device 150 can be used within surface parts enclosed or partially enclosed by devices 10. Alternatively, floating device 150 can be used independently of devices 10. For example, a plurality of floating device like device 150 can be used to cover a liquid surface.

Figure 16A:
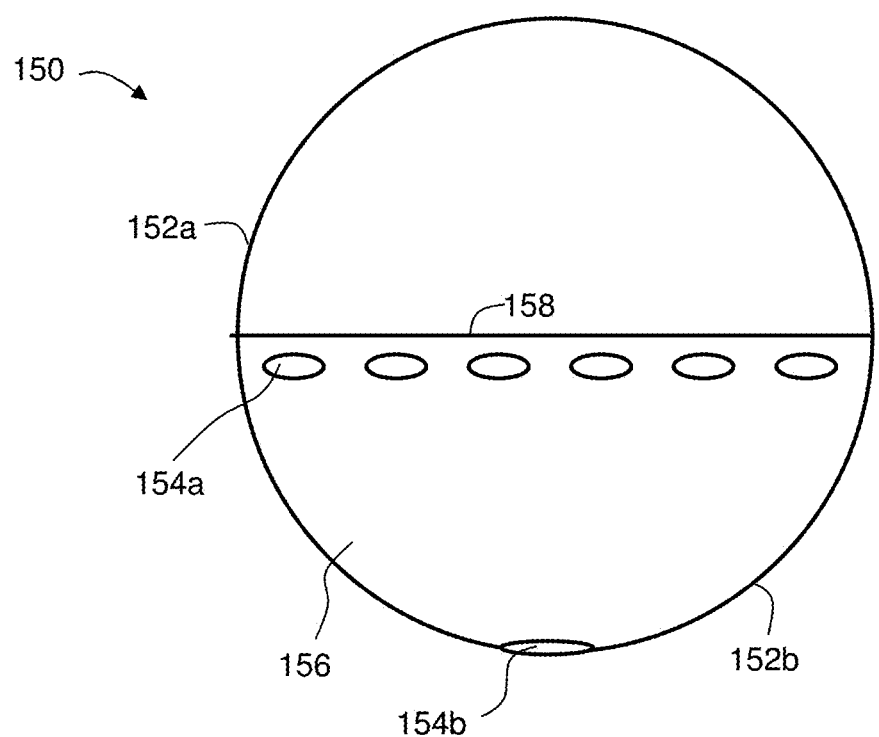
FIGS. 16A-H are schematic illustrations of a secondary floating device according to some embodiments of the present invention.

FIG. 16A illustrates an embodiment in which device 150 comprises a generally spherical hollow body 152 formed with a plurality of openings, and a separator member 158 wherein some of the openings, designated 154a are arranged near member 158 and one or more of the openings, designated 154b are far from member 158. Preferably, opening 154b is at the farthest pole of body 152 with respect to member 158. Member 158 is typically located at or near the equator line of body 152, thereby dividing body 152 to an upper hemisphere 152a and a lower hemisphere 152b. When device 150 is placed on the liquid surface, the liquid enters through openings 154 and its lower part is submerged such that member 158 is approximately leveled the surface of the liquid.

Figure 16B:
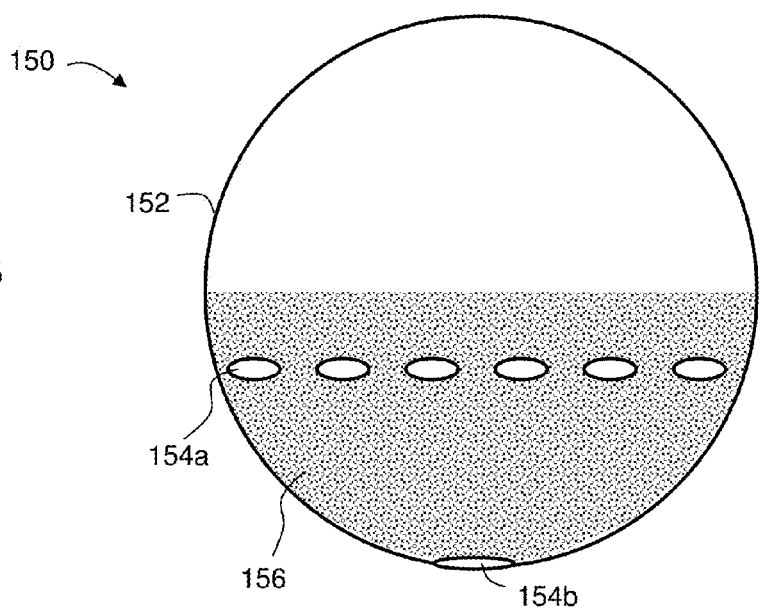

FIG. 16B illustrates an embodiment in which device 150 comprises a generally spherical hollow body 152 formed with a plurality of openings, and a solid absorbent 156 occupying a portion of a volume of body 152. Absorbent 156 preferably fills all or most of the volume enclosed by the hemisphere below the equator line. Body 152 can be provided with one or more openings where opening(s) where openings 154a are arranged near the equator and opening(s) 154b are, for example, at the farthest pole of body 152 with respect to the equator line.

Absorbent 156 can be any absorbent material that is generally compressible, and capable of absorbing and retaining liquids, such as, but not limited to, polyester, polyurethane, PVA etc., a geo-textile fabric, felt or foam.

In use, device 150 is placed on the water surface. As liquid begins entering through openings 154 into the hemisphere below the equator line, the specific weight of absorbent 156 gradually increases and the lower hemisphere of device 150 begins to submerge. Once the absorbance capacity of absorbent 156 is approached, the equator line is approximately leveled with the surface of the liquid. Such floating condition of device 150 ensures stability and prevents or reduces elevation of device 150 above the liquid surface by wind forces.

Figure 16C:
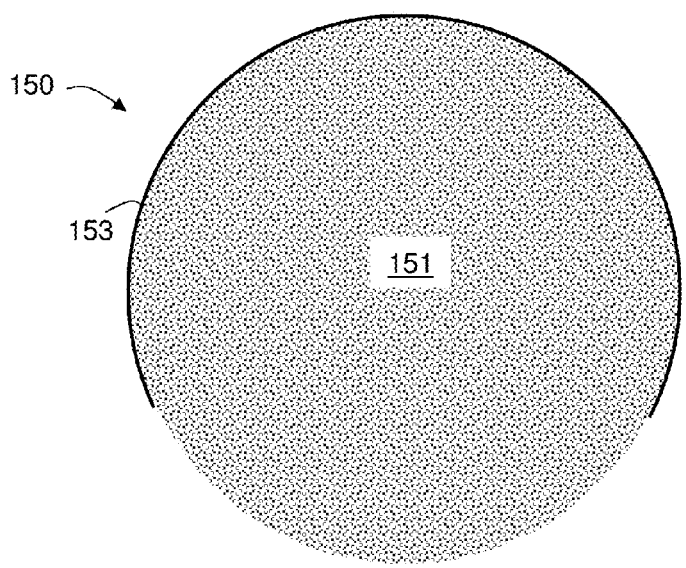

FIG. 16C illustrates an embodiment in which device 150 comprises a ball-like structure 151 made of a solid absorbent material such as, but not limited to, absorbent 156. Structure 151 is partially coated by a water resistant dome 153, which is made of a water resistant material. Dome 153 preferably covers more than 50%, or more than 60% but less than 80% or less than 70% of the surface of structure 151. Preferably, but not necessarily, dome 153 is devoid of openings.

The term "dome" refers to a generally rounded, three-dimensional shape, having a convex surface and a concave surface, and is not limited to a hemisphere or any portion of a sphere. Nevertheless, in some embodiments of the present invention the dome has a shape of a portion of a sphere.

In use, device 150 is placed on the water surface. As liquid begins entering through the non covered part of structure 153, the specific weight of absorbent 156 gradually increases and the lower hemisphere of device 150 begins to submerge, as further detailed hereinabove.

Figure 16D:
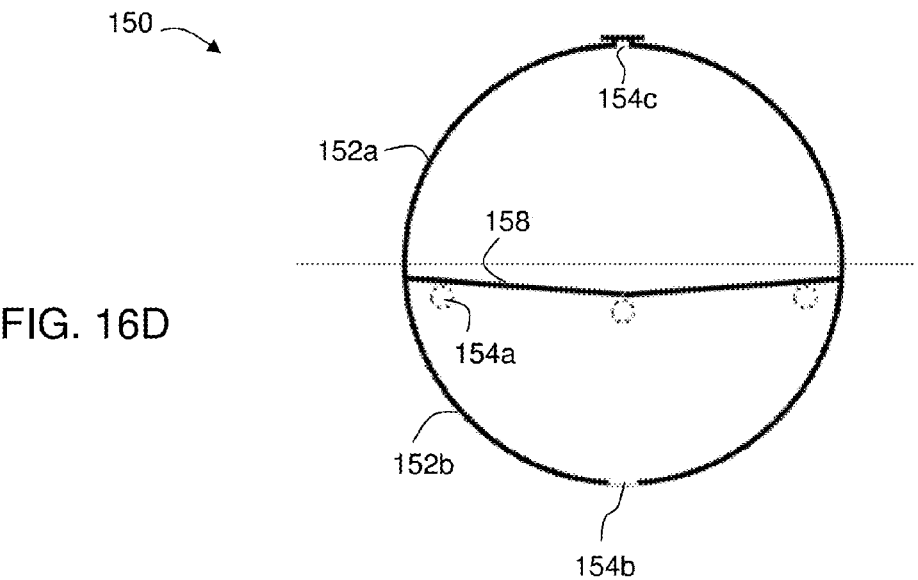
Figure 16E:
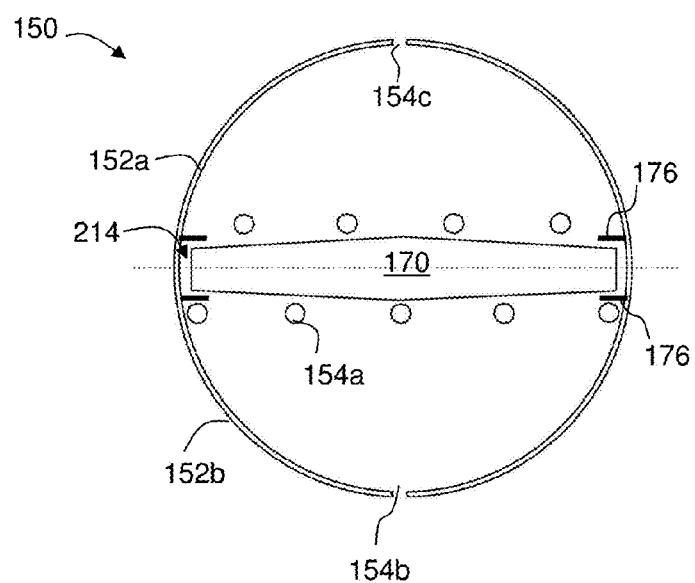

FIG. 16D illustrates an embodiment in which device 150 comprises a generally spherical hollow body 152 formed with a plurality of openings, and a concave separator member 158. The inclination angle of member 158 is typically from about 1% to about 3%. Similarly to the embodiment shown in FIG. 16A, openings designated 154a are arranged near member 158 and opening 154b is at the farthest pole of body 152 with respect to member 158. Optionally and preferably, device 150 also comprises an opening 154c at the top pole of body 152. Top opening 154c preferably comprises a cover 155, e.g., for preventing rain water to enter into the upper part of the device.

Member 158 is typically located at or near the equator line of body 152, thereby dividing body 152 to an upper hemisphere 152a and a lower hemisphere 152b. In various exemplary embodiments of the invention member 158 is below the equator so as to increase the buoyancy effect. When device 150 is placed on the liquid surface, the liquid enters through openings 154 and its lower part is submerged such that member 158 is approximately leveled the surface of the liquid.

The hemispheres 152a and 154b can be may be made using different colors (e.g., white-black, white-blue etc.) with the brighter color at the top side. In various exemplary embodiments of the invention the top part is heavier than the bottom. This can be achieved for example, by providing the top hemisphere with a thicker wall compared to the wall thickness of the bottom hemisphere. The difference in weights can alternatively or additionally be achieved using different materials for the walls of the top and bottom hemisphere, e.g., polyethylene for the top hemisphere and polypropylene for the bottom hemisphere. When a malfunction occurs and liquid enters also to the top part, device 150 flips vertically showing the darker color up. As the dark color is distinctive on the background of the brighter color, this serves as an indication that the device should be replaced.

In some embodiments of the present invention the anterior of the upper hemisphere is filled with a porous material having a specific weight which is lower than the specific weight of the liquid on which the device is to be placed. Preferably the porous material is a non-absorbent. In some embodiments of the present invention the porous material is hydrophobic. The porous material can be, for example, foamed closed-cell material including, without limitation, Polyvinyl chloride (PVC), Polyethylene, Polypropylene and the like.

FIGS. 16E-H illustrate an embodiment in which device 150 comprises a generally spherical hollow body 152 formed with a plurality of openings, and a floating separator member 170, approximately at or near the equator line of body 152. Floating separator member 170 can be made, for example, from a foamed material or any other material with sufficiently low specific weight to allow it to float on the liquid. Floating separator member 170 is preferably maintained in its position at or near the equator line by means of stopper elements 176. Optionally and preferably there is a gap 214 between the periphery of floating separator member 170 and the internal wall of device body 152. Gap 214 can be formed by providing member 170 with a diameter that is slightly smaller than the largest diameter of device body 152, or by generating small shape mismatches (e.g., recesses and the like) between the periphery line of member 170 and the equator line of device body 152. The advantage of having gap 214 is that it allows some fluid communication between the top and bottom half of device 150. This is particularly useful when device 150 is utilized, for example, for vapor condensation, as further detailed hereinbelow.

Figure 16F:
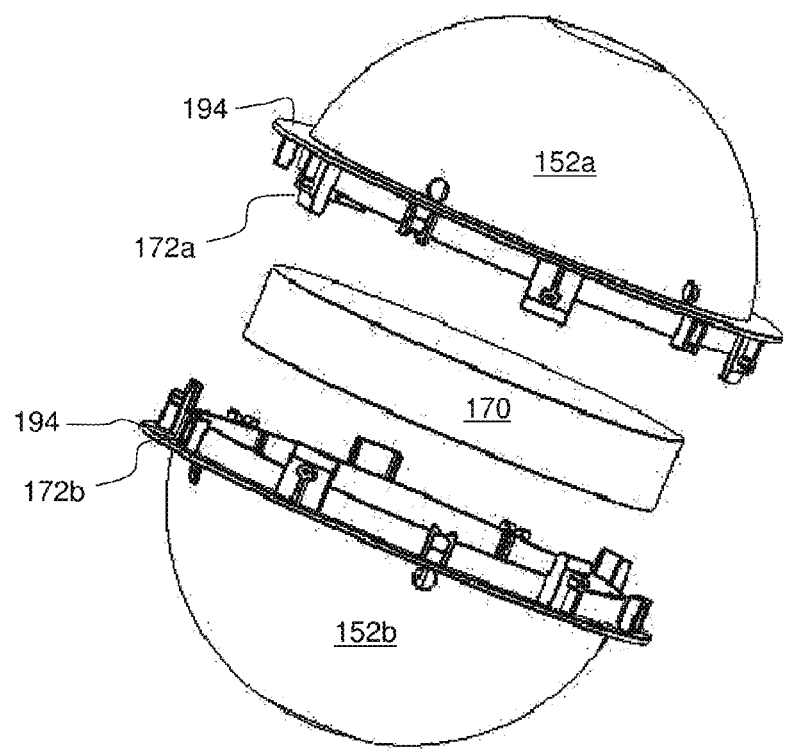

Device 150 can be made from hemispheres which are identical in shape, size and optionally and preferably also weight. An exploded view of this embodiment is illustrated in FIG. 16F. The connectors between hemispheres can be of a male-female snap type to allow quick assembling of the device. The male and female connectors are shown at 172a and 172b, respectively.

Figure 16G:
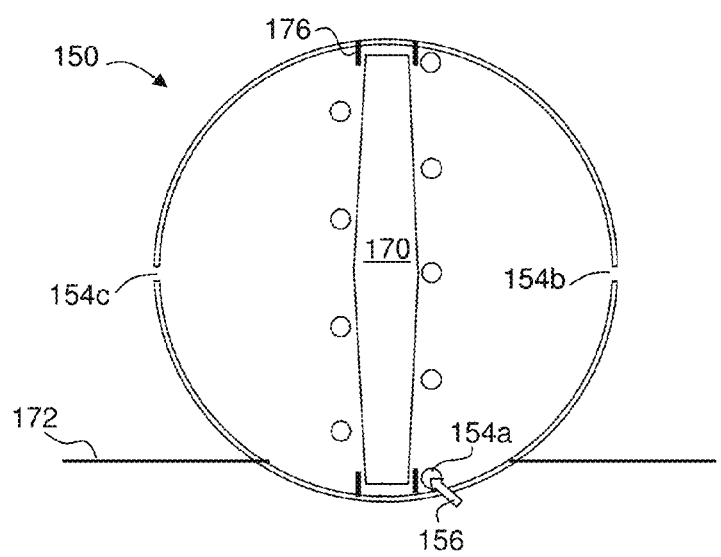

In these embodiments, the openings that are near the equator line (opening 154a) are arranged at both sides of floating separator member 170. Preferably, connectors 172a and 172b are arranged such that when the two hemispheres are assembled, the openings of one hemisphere are azimuthally shifted with respect to the openings of the other hemisphere (for example, a shift of half the distance between adjacent openings). The advantage of this embodiment is that when device 150 is placed on the surface of the liquid, there is a high likelihood that liquid will enter only to one side of the device through the opening or openings that first contacts the liquid. This is illustrated in FIG. 16G, showing device 150 on a surface 174 of a liquid, wherein an influx 156 of liquid enters first through opening 154a. The influx of liquid into one side of device 150 makes the respective side heavier and provides device 150 with a self-righting property. Thus the heavier hemisphere is gradually filled with liquid and the device is oriented such that the openings of the heavier hemisphere are below the liquid surface. The openings of the other hemisphere remain above the liquid surface and can serve as venting holes.

Figure 16H:
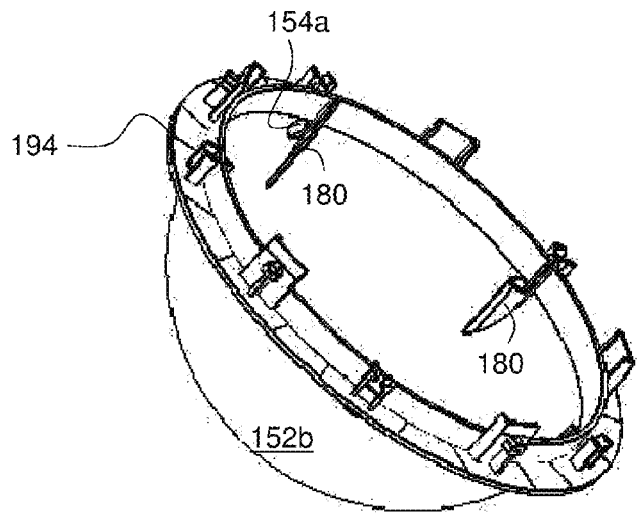

FIG. 16H illustrates an embodiment in which the inner side of body 152 comprises a plurality of wings 180 arranged at or near the equator line of body 152. For clarity of presentation, FIG. 15H only shows wings 180 at one hemisphere of body 152 (hemisphere 152b), but it is to be understood that both hemispheres can include wings 180. Wings 180 are typically positioned near openings 154a, so as to block entry of direct light into the anterior of the cavity, thereby reducing the amount of alga growth within body 152. For the hemisphere that remains above the surface of the liquid wings 180 also serve for redirecting incoming air in a manner that generates circulation of air within the hemisphere. Wings 180 can additionally serve as stopper elements (instead or in addition to elements 176) for maintaining the floating member at its position. In various exemplary embodiments of the invention the opening at the poles of device 150 (e.g., openings 154b and 154c) are enclosed by a sleeve (not shown, see FIG. 17B) which reduces the amount of direct sunlight that enters the hemisphere above the liquid surface. This embodiment is advantage since reduced light also reduces the rate of algae growth within the device.

Figure 17A:
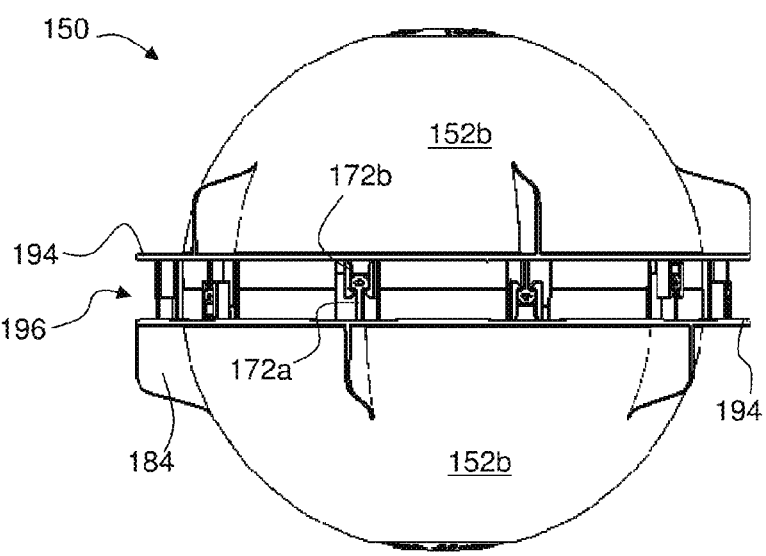
FIG. 17A is a schematic illustration of a floating device in embodiments of the present invention in which the device comprises a plurality of external wings to allow winds to rotate the device.

FIG. 17A is a schematic illustration of device 150 in embodiments of the present invention in which device 150 further comprises a plurality of external wings 184 distributed on the external of body 152, such as to allow winds to somewhat rotate the device and avoid for overleaping between adjacent devices. The number of external wings is preferably odd (for example, 5 or 7 wings). The openings of device 150 are not shown in FIG. 17, but it is to be understood that it is not intended to limit the scope of the present invention to a device without openings. The openings can be distributed, for example, as shown in FIGS. 16A-H. Also contemplated are embodiments in which at least some openings are distributed behind the connectors 172a and 172b.

Figure 17B:
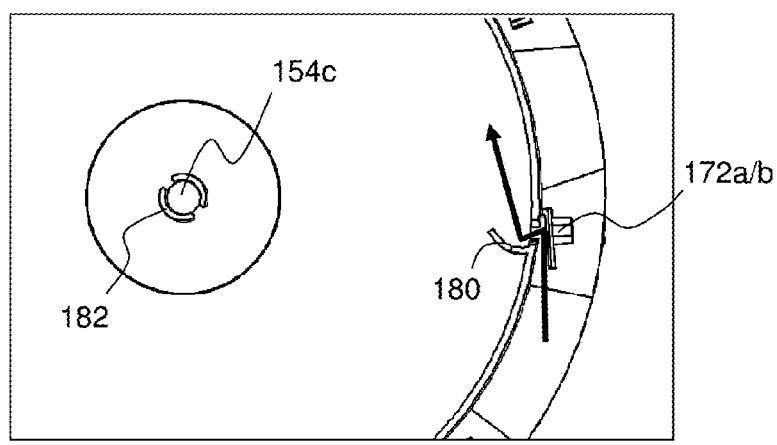
FIG. 17B is a schematic illustration of a partial top view of a hemisphere of a floating device according to some embodiments of the present invention.

A partial top view of the hemisphere is schematically illustrated in FIG. 17B, showing a sleeve 182 enclosing opening 154c. Also shown in FIG. 17B is one of wings 180. In the embodiment of FIG. 17B, the openings are at the equator line behind connectors 172a/172b. Air enters into the hemisphere through the openings at the equator lines and is redirected by wings 180. The direction of airflow is illustrated as an arrow.

Figure 18A:
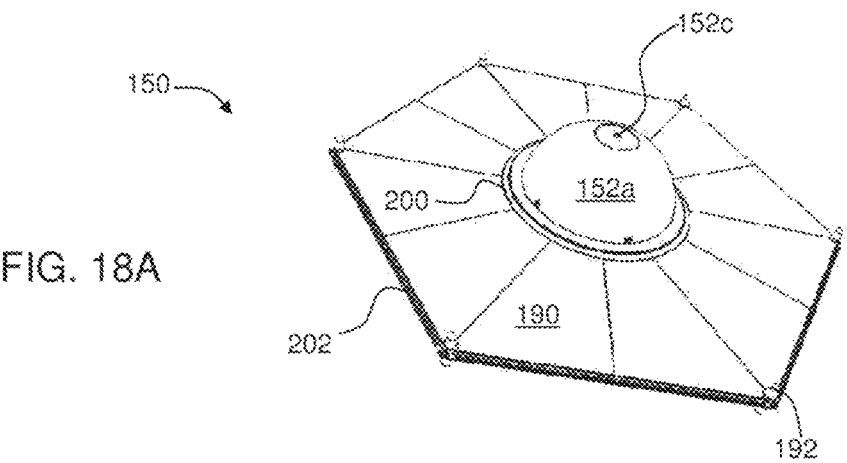
FIGS. 18A-C are schematic illustrations of a floating device in embodiments of the present invention in which the device comprises an external peripheral extension surrounding the body of the device.
Figure 18B:
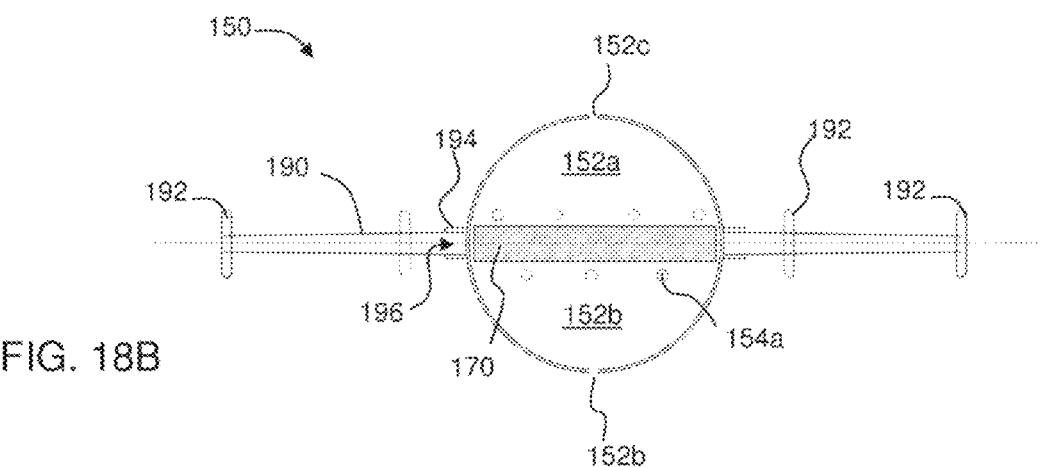
Figure 18C:
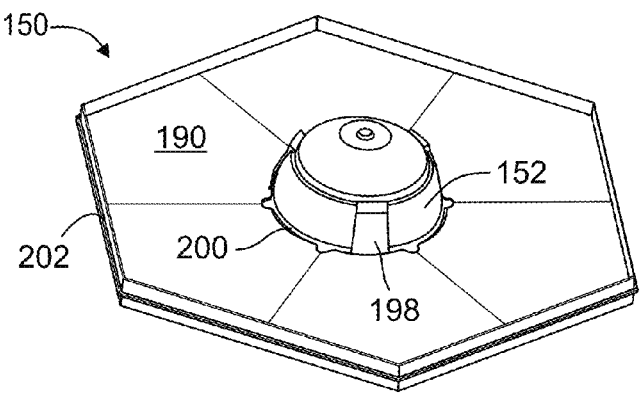

FIGS. 18A-C is a schematic illustration of device 150 in embodiments of the present invention in which device 150 further comprises an external peripheral extension 190 which surrounds device body 152. Preferably, extension 190 is generally flat. Peripheral extension 190 has an inner peripheral end 200 being in proximity or in contact with device body 152 and an outer peripheral end 202 being farther than device body 152. Inner peripheral end 200 is preferably circular and with a diameter that is the same or slightly above the diameter of device body 152. This allows device body 152 to fit into end 200 of extension 190. Outer peripheral end 202 can have any shape. Preferred shapes include geometrical figures that allow a plurality of devices like device 150 to tile a liquid surface. For example, in some embodiments of the present invention end 202 of extension 190 has a shape of a hexagon. Extension 190 is preferably made from a material with sufficiently low specific weight to allow it to float on the liquid. In some embodiments of the present invention extension is made from a foamed closed-cell material including, without limitation, Polyvinyl chloride (PVC), Polyethylene, Polypropylene and the like.

Peripheral extension 190 serves for increasing the surface area of device 150 on the surface of the liquid. Peripheral extension 190 may comprise protrusions 192 at peripheral end 202. Protrusions 192 serve for preventing or at least reducing the likelihood of piling of two or more devices one on top of the other.

Many types of connections between device body 152 and peripheral extension 190 are contemplated. In some embodiments, schematically illustrated in FIG. 18B, each hemisphere of body 152 is provided with a rim 194 (also shown in FIGS. 16F, 16H, 17) near the equator line, such that when the two hemisphere are assembled a circular niche 196 is formed between the rims. Peripheral extension 190 can be constituted such as to fit into niche 196.

In some embodiments, schematically illustrated in FIG. 18C, a plurality of elastic tongs 198 are distributed around the inner peripheral end 200 of extension 190. Tongs 198 are biased against the outer wall of both hemispheres 152a and 152b thereby affixing body 152 to extension 190. The advantage of these embodiments is that body 152 is allowed to rotate both azimuthally and inclinationally. Tongs 198 can resemble the mechanism found in common ball-and-socket wrench kits. In various exemplary embodiments of the invention each of the hemispheres of body 152 is provided with a circular recess 204 which receives the ends of tongs 198.

It was found by the present inventor that when device 150 is placed on the surface of liquid such as water, it can be utilized for facilitating vapor condensation. In these embodiments, the color of the upper hemisphere of device 150 is bright so as to reflect broad spectrum of the solar radiation. For example, the upper hemisphere can be white or it can be made of or coated with a sunlight-reflective material. In preferred embodiments in which the two hemispheres are identical in structure as well as in color, both hemispheres have a bright color or are coated with a sunlight-reflective material.

Figure 19:
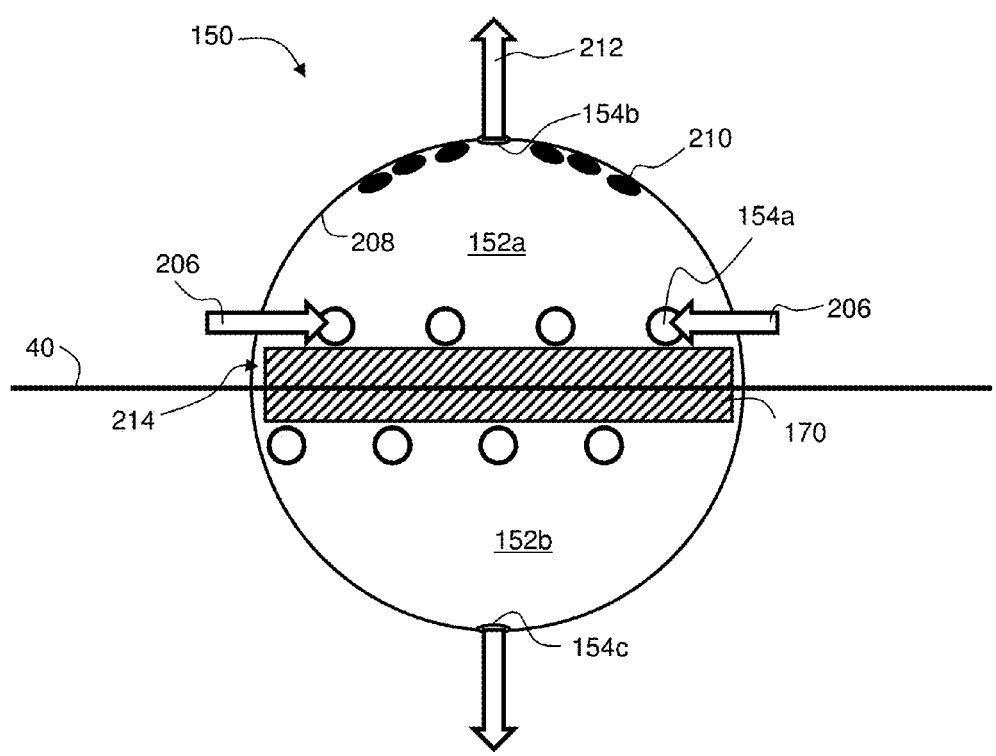
FIG. 19 is a schematic illustration of a floating device in embodiments of the invention in which the device is utilized for condensation.

The condensation process, according to some embodiments of the present invention will now be described with reference to FIG. 19, which illustrates device 150 in the embodiments in which the device comprises floating separator member 170. During high solar intensity, e.g., from some time (e.g., 1-4 hours) before the noon intensity peak to some time (e.g., 3-4 hours) before sunset, the evaporation of water is significant, and the air above the water surface 40 becomes humid. The humidity is highest near water surface 40 where evaporation takes place. Therefore, the air 206 that enters device 150 through the venting openings above water surface 40 is hot and humid. Due to the reflectivity of the water surface, the tendency of hot air to rise upwards, and side winds (when present), most of the air enters through the openings 152a near or at the equator line of device 150. The hot and humid air begins to rise within the upper hemisphere 152a, optionally via a turbulent flow generated, at least in part, by wings 180 (not shown in FIG. 19, see FIGS. 16H and 17B), until the air interacts with the internal wall 208 of upper hemisphere 152a.

Since upper hemisphere 152a reflects broad spectrum of the solar radiation, the temperature of internal wall 208 is lower than the temperature of the air that have just entered the hemisphere. Thus, as the air reaches internal wall 208, condensation occurs and water drops 210 are formed on the internal wall, and air within the anterior of hemisphere 152a becomes dryer. The dryer air 212 exits through opening 154b at the pole of hemisphere 152a. Under the effect of gravity, at least some of water drops 210 slide on internal wall 208 toward the equator line of device 150, bypass floating separator member 170 through gap 214 between member 170 and internal wall 208, and mix with the water already filling the anterior of lower hemisphere 152b. Since floating separator member 170 maintains a generally constant volume of water within device body 152, excess water exits through the openings that are below water surface 40. In the illustration of FIG. 19, the efflux of excess water is shown at 216 through opening 154c, but some water may also exit through the openings located near and below water surface 40.

Figure 22:
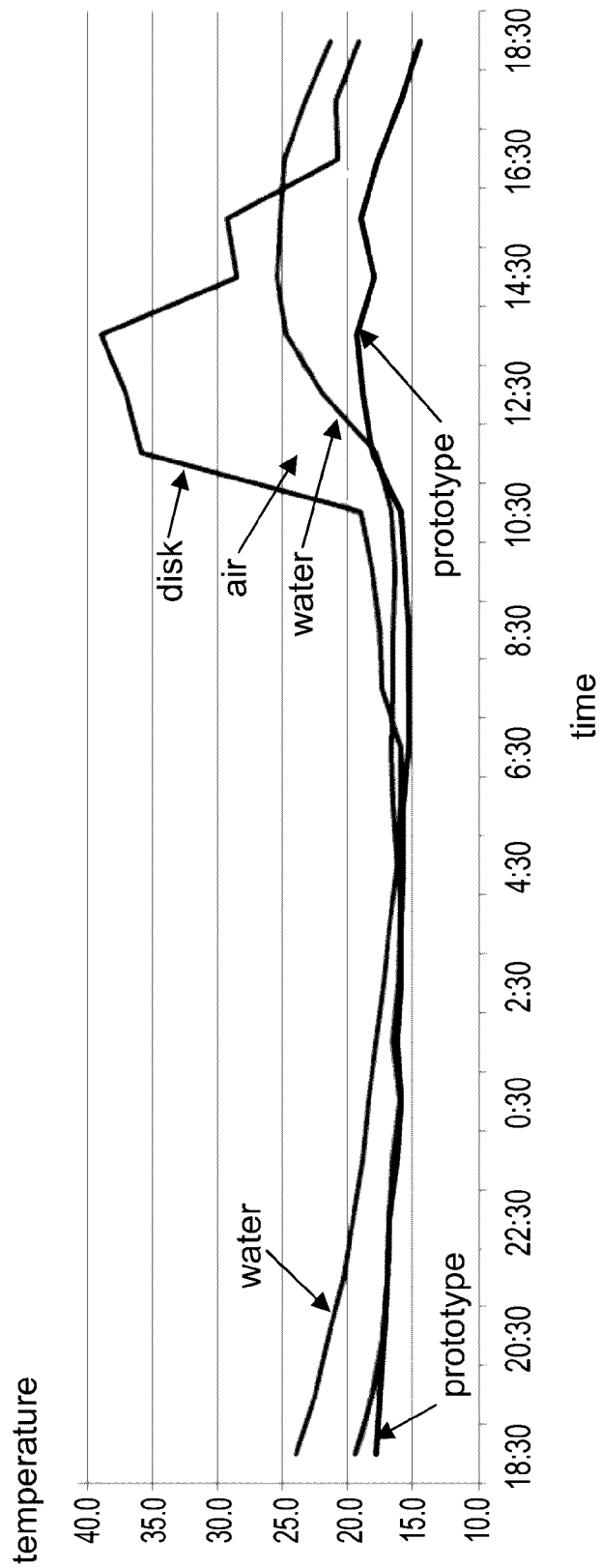
FIG. 22 is a graph showing the temperatures (° C.) of the prototype device, plastic disk, environmental air and water as a function of the time of the day (in a hh:mm format), as obtained during an experiment performed according to some embodiments of the present invention.

It was unexpectedly found by the inventor of the present invention that device 150 remains cooler than the environmental air for many hours (see, FIG. 22 in the Examples section that follows). The gap between the separator member and the body of the device allows evaporation within the device. Consequently air is released through the opening at the upper pole 154, and device 150 functions essentially as a cooling tower. This allows device 150 to condensate also when the solar intensity is low, for example, early at the morning, and even at night times. Specifically, due to the low temperature of deice 150 dew drops are formed on the external wall of the device. The dew drops slide on the external wall and enter the water underneath the device.

The low temperature of device 150 also reduces the temperature of the water underneath the device. Thus, when a plurality of devices like device 150 are placed on a surface of a water reservoir, the temperatures of the water surface, hence also the water bulk is reduced. This is an advantage since it increases the quality of water by allowing more dissolved air in. The evaporation-condensation cycle within the device is also advantageous since the condensed water that returns into the reservoir is pure water.

In applications in which evaporation of the body of water is desired (e.g., when device 150 is used for covering an evaporation ponds or part thereof), the upper hemisphere of device 150 can be made dark so as to absorb sunlight. In these embodiments, the temperature of device 150 is higher than the temperature of the liquid on which the device is placed. As a result, the temperature of the liquid at the liquid surface near the device is increased, and the evaporation is higher.

At least some of the properties of device 150 are also possessed by device 10 described above. In particular, both device 150 and device 10 are capable of circulating air therein, facilitate condensation and generation of dew drops, maintaining low temperatures and have self-righting property.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub ranges as well as individual numerical values within that range. For example, description of a range such as from 1 to 6 should be considered to have specifically disclosed sub ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Twenty four models of floating devices according to some embodiments of the present invention were made from polyethylene terephthalate. The models where painted with silver like hue to reflect heat and light. The cup members had a generically cylindrical shape and the hat members had a shape of a top of a bottle. The members of each model were glued together.

Two identical tubs were filled with 26 Kg of tap water, one tub was left as is for control and the other tub was covered with the model devices. The models covered about 60% of the water surface, due to the shapes and sizes of tubs and models. The tubs were weighted the temperatures were measured every few hours.

Figure 20A:
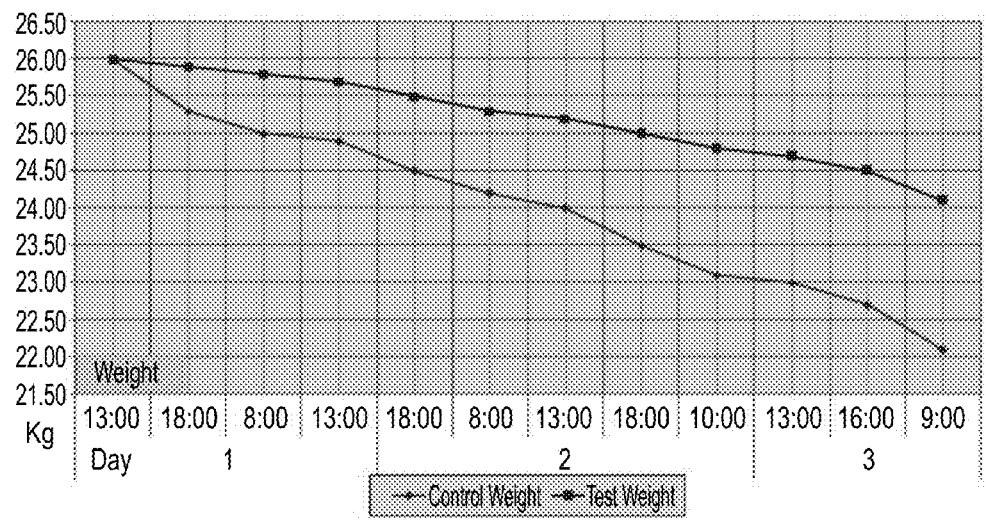
FIGS. 20A and 20B shows the weight loss in kilograms (FIG. 20A) and the temperature in centigrade degrees (FIG. 20B) as a function of time in hours, as measured during an experiment performed according to some embodiments of the present invention.
Figure 20B:
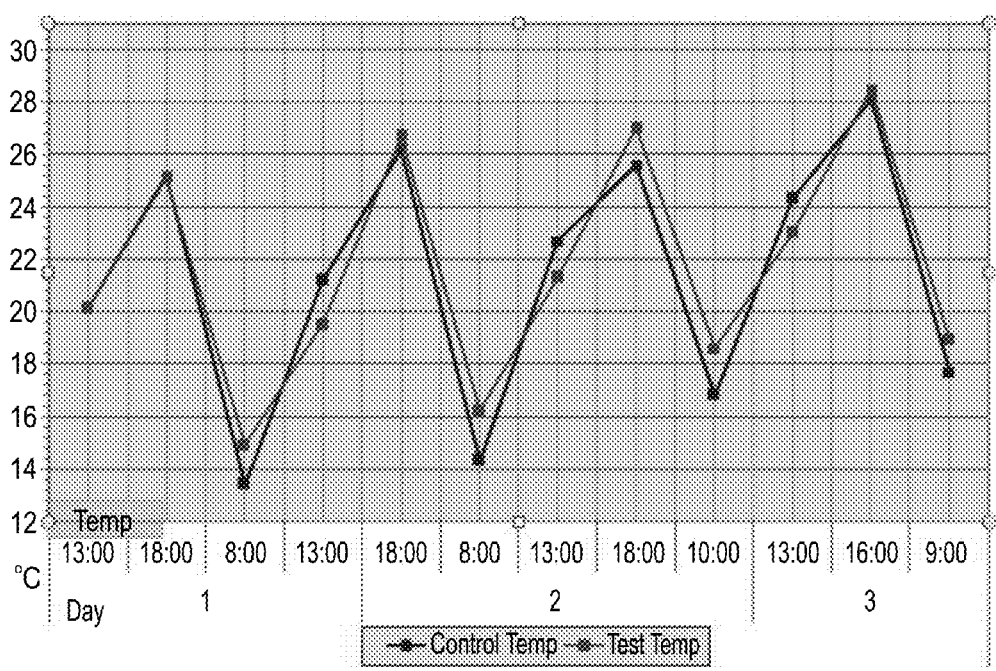

The results of the experiment are summarized in Table 1, below, and depicted graphically in FIGS. 20A and 20B, where FIG. 20A shows the weight loss in kilograms as a function of time in hours, and FIG. 20B shows the temperature in centigrade degrees as a function of time in hours. As shown, the overall evaporation saving during the experiment was over 51% (saving of 2 Kg of 3.9 Kg) and the temperatures of the test tub were lower during the day and higher during the night. These results demonstrate the ability of the device of the present embodiments to serve as a floating insulating barrier.

TABLE 1

| | | Control | | Test | |
| --- | --- | --- | --- | --- | --- |
| Day | Time | Weight | Temperature | Weight | Temperature |
| 1 | 13:00 | 26.0 | 20.1 | 26.0 | 20.1 |
| | 18:00 | 25.3 | 25.2 | 25.9 | 25.1 |
| | 08:00 | 25.0 | 13.4 | 25.8 | 14.9 |
| 2 | 13:00 | 24.9 | 21.2 | 25.7 | 19.5 |
| | 18:00 | 24.5 | 26.2 | 25.5 | 26.7 |
| | 08:00 | 24.2 | 14.3 | 25.3 | 16.2 |
| 3 | 13:00 | 24.0 | 22.7 | 25.2 | 21.3 |
| | 18:00 | 23.5 | 25.6 | 25.0 | 27.0 |
| | 10:00 | 23.1 | 16.8 | 24.8 | 18.6 |
| 4 | 13:00 | 23.0 | 24.3 | 24.7 | 23.0 |
| | 16:00 | 22.7 | 28.1 | 24.5 | 28.5 |
| 5 | 09:00 | 22.1 | 17.7 | 24.1 | 18.9 |
| Total weight loss (Kg) | | 3.9 (=15%) | | 1.9 (=7.3%) | |

Example 2

Figure 21A:
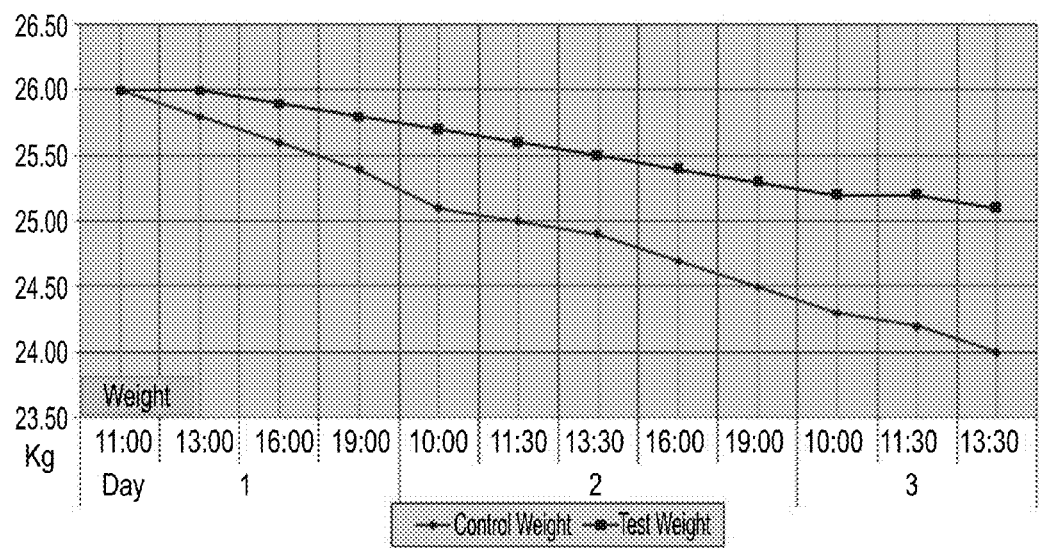
FIGS. 21A and 21B shows the weight loss in kilograms (FIG. 21A) and the temperature in centigrade degrees (FIG. 21B) as a function of time in hours, as measured during another experiment performed according to some embodiments of the present invention.
Figure 21B:
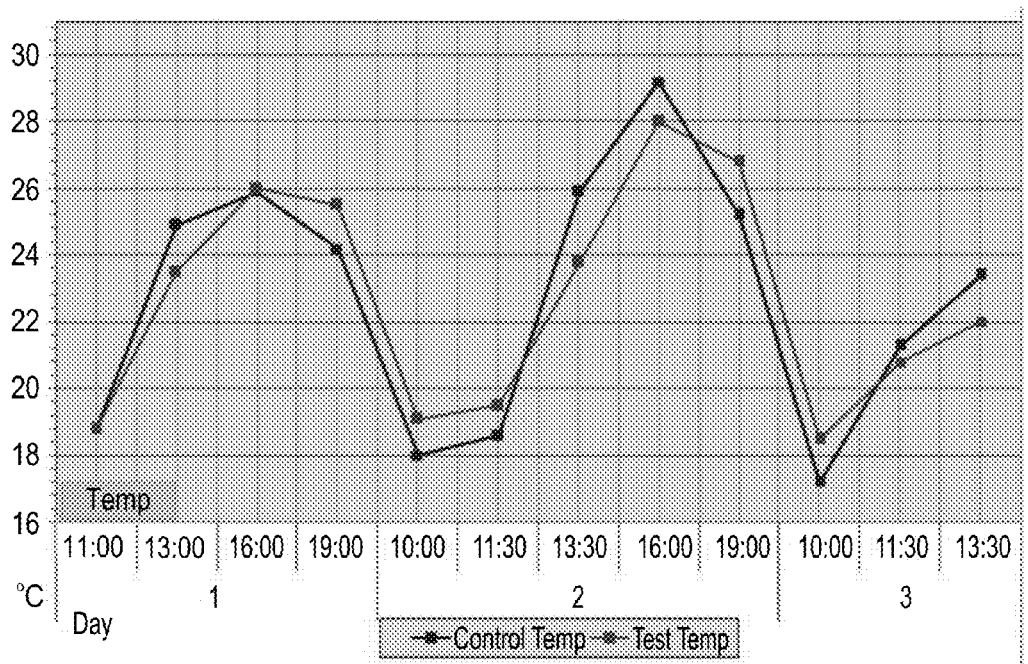

The experiment of Example 1 was repeated except that the hat member included an opening at their apex to allow hot air to escape. The results of the experiment are summarized in Table 2, below, and depicted graphically in FIGS. 21A and 21B, where FIG. 21A shows the weight loss in kilograms as a function of time in hours, and FIG. 21B shows the temperature in centigrade degrees as a function of time in hours. As shown, evaporation saving was higher (55%) with the opening at the apex of the hat member. Also, the temperature variations in this example were less abrupt. The peak temperatures did not exceed those of the control indicating that the model devices did not accumulate heat themselves and did not heat the surface of water.

TABLE 2

| | | Control | | Test | |
| --- | --- | --- | --- | --- | --- |
| Day | Time | Weight | Temperature | Weight | Temperature |
| 1 | 11:00 | 26.0 | 18.8 | 26.0 | 18.8 |
| | 13:00 | 25.8 | 24.9 | 26.0 | 23.5 |
| | 16:00 | 25.6 | 25.9 | 25.9 | 26.0 |
| | 19:00 | 25.4 | 24.2 | 25.8 | 25.5 |
| 2 | 10:00 | 25.1 | 18.0 | 25.7 | 19.1 |
| | 11:30 | 25.0 | 18.6 | 25.6 | 19.5 |
| | 13:30 | 24.9 | 25.9 | 25.5 | 23.8 |
| | 16:00 | 24.7 | 29.2 | 25.4 | 28.0 |
| | 19:00 | 24.5 | 25.2 | 25.3 | 26.8 |

TABLE 2-continued

| | | Control | | Test | |
|---|---|---|---|---|---|
| Day | Time | Weight | Temperature | Weight | Temperature |
| 3 | 10:00 | 24.3 | 17.2 | 25.2 | 18.5 |
| | 11:30 | 24.2 | 21.3 | 25.2 | 20.8 |
| | 13:30 | 24.0 | 23.4 | 25.1 | 22.0 |
| Total weight loss (Kg) | | 2.0 (=7.7%) | | 0.9 (=3.46%) | |

It is envisioned that in very hot climates the openings at the apex will play as safety valves and maintain better levels of evaporation. The temperature of the device is reduced by the evacuation of hot air and less heat is transferred by conduction to the surface of the water.

Example 3

In this example, the performances of a prototype secondary floating device according to some embodiments of the present invention were tested and compared to a conventional floating device.

The prototype secondary floating device included a generally spherical hollow body, 10 cm in diameter, formed with openings, and a floating separator member at the level of the equator with a gap between separator and body. The separator was a round disk, 4.2 cm in radius, made of polystyrene. Eight openings were formed on the body of the prototype, each opening 4 mm in diameter (see FIG. 16E).

The conventional floating device was a non-hollow plastic disk.

Both the prototype and the plastic disk were black.

The prototype device and plastic plate were placed on a water surface within an open water tank having a surface area of about 20×60 cm and a fence separating between the prototype and the disk. The depth of the water in the tank was about 30 cm. The temperatures of the prototype device, the plastic disk, the environmental air and the water were monitored over a period of 24 hours. Temperature measurements were collected approximately every 60 minutes.

FIG. 22 is a graph showing the temperatures (° C.) of the prototype device, plastic disk, environmental air and water as a function of the time of the day (in a hh:mm format). As demonstrated by FIG. 22, the prototype device of the present embodiments exhibited low temperature during the entire experiment. During day time (from 7AM to 6:45PM), the temperature of the prototype device was significantly lower than the temperature of the air. A temperature difference of about 5° C. between the temperatures of the air and the prototype device was measured during high solar intensities (approximately from 11AM to 4PM). This demonstrates the ability of the device of the present embodiments to facilitate vapor condensation and collecting dew. Except from a single measurement between 11AM and 12PM, the temperature of the prototype device was always below the water temperature, demonstrating that when a plurality of devices of the present embodiments cover a water surface they can significantly reduce water temperature.

It is noted that the conventional disk exhibited very high temperatures (more than 10° C. above the air temperature) during high solar intensities. It is concluded that vapor condensation cannot occur on the surface of the disk.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for placing on a liquid surface, the device comprising:
 a generally spherical hollow body having a first hemisphere and a second hemisphere, said first and said second hemispheres being connectable to each other by a plurality of snap connectors formed on at least one of said hemispheres
 a floating member, generally shaped as a disk separating a volume enclosed by said first hemisphere from a volume enclosed by said a second hemisphere and being disconnectedly disposed within an anterior of said body approximately at the equator line of said body; and
 one or more stopper elements formed on each hemisphere near, and extending substantially parallel to said equator line of said body for holding said floating member in place approximately at said equator line at all times when the device is placed on the liquid surface.

2. The device according to claim 1, wherein said floating member is selected such that there is at least one gap between said floating member and said body.

3. The device according to claim 1, wherein said body is formed with a plurality of openings distributed peripherally on each hemisphere such that when said hemispheres are assembled, openings of said first hemisphere are azimuthally shifted with respect to openings of said second hemisphere.

4. The device according to claim 3, further comprising a plurality of internal wings arranged at the anterior of said body at or near said equator line such as to block entry of direct light into the anterior of the cavity and also to facilitate circulation of air entering said anterior through at least some of said openings.

5. The device according to claim 1, wherein said body is formed with a plurality of openings, at least one of which being located at a portion of a respective hemisphere that is behind one of said connectors.

6. The device according to claim 1, being positioned on the surface of the liquid and further comprising a plurality of external wings distributed on external surface of said body, such as to allow winds to rotate said body.

7. The device according to claim 1, further comprising an external peripheral extension surrounding said body, said peripheral extension having an inner peripheral end being in proximity or in contact with said body and an outer peripheral end being farther from said body.

8. The device according to claim 7, wherein said inner peripheral end is circular and said outer peripheral end has a shape selected for allowing a plurality of similar extensions to tile an area in a fitted manner.

9. The device according to claim 7, wherein said peripheral extension comprises a plurality of protrusions extending generally perpendicular to said extension at said peripheral end.

10. The device according to claim 7, wherein each of said first hemisphere and said second hemisphere comprises a rim generally parallel to an equator line thereof such that when said first and said second hemisphere are assembled a niche formed between the rim of said first hemisphere and the rim of said second hemisphere, and wherein said peripheral extension is constituted such as to fit into said niche.

11. The device according to claim 7, wherein said peripheral extension comprises a plurality of elastic members distributed around said inner peripheral end, said members being biased against an outer wall of said body to affix said body to said peripheral extension.

12. The device according to claim 11, wherein each of said first and said second hemispheres comprises a circular recess configured such that each of at least a portion of said elastic members engages one of said recesses.

13. The device according to claim 1, further comprising an internal sleeve enclosing said opening at said pole of said body.

14. A method of at least partially covering a liquid surface, comprising placing a plurality of floating devices on the liquid surface wherein at least a portion of said floating devices is according to claim 1.

15. The device according to claim 1, wherein at least one of said hemispheres comprises an opening at a pole thereof, said opening being open to an environment surrounding the device.

* * * * *